(12) United States Patent
Suzuki et al.

(10) Patent No.: US 6,833,940 B2
(45) Date of Patent: Dec. 21, 2004

(54) METHOD AND APPARATUS FOR OPTICAL SCANNING CAPABLE OF PERFORMING A HIGH SPEED AND HIGH PIXEL DENSITY SCANNING

(75) Inventors: Seizo Suzuki, Kanagawa-ken (JP); Kenichi Takanashi, Chiba-ken (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/278,878

(22) Filed: Oct. 24, 2002

(65) Prior Publication Data

US 2003/0133175 A1 Jul. 17, 2003

(30) Foreign Application Priority Data

Oct. 24, 2001 (JP) ..................................... P2001-326329

(51) Int. Cl.[7] ............................................. G02B 26/08
(52) U.S. Cl. ..................... 359/204; 359/219; 347/243
(58) Field of Search ................................ 359/196, 204, 359/205, 206, 216, 217, 218, 219; 347/233, 241, 243

(56) References Cited

U.S. PATENT DOCUMENTS

| 6,069,724 | A | 5/2000 | Hayashi et al. |
| 6,081,386 | A | 6/2000 | Hayashi et al. |
| 6,104,522 | A | 8/2000 | Hayashi et al. |
| 6,185,026 | B1 | 2/2001 | Hayashi et al. |
| 6,188,086 | B1 | 2/2001 | Masuda et al. |
| 6,233,081 | B1 | 5/2001 | Suzuki et al. |
| 6,256,133 | B1 | 7/2001 | Suzuki et al. |
| 6,317,246 | B1 | 11/2001 | Hayashi et al. |
| 6,347,004 | B1 | 2/2002 | Suzuki et al. |
| 6,359,717 | B2 | 3/2002 | Suzuki et al. |
| 6,384,949 | B1 | 5/2002 | Suzuki |
| 6,388,792 | B1 | 5/2002 | Atsuumi et al. |
| 6,400,391 | B1 | 6/2002 | Suhara et al. |
| 6,417,509 | B1 | 7/2002 | Atsuumi et al. |
| 6,448,998 | B1 | 9/2002 | Suzuki et al. |
| 6,509,995 | B1 | 1/2003 | Suzuki et al. |

*Primary Examiner*—Mark A. Robinson
(74) *Attorney, Agent, or Firm*—Oblon, Spivak, McClelland, Maier & Neustadt, P.C.

(57) ABSTRACT

An optical scanning apparatus using an underfilled or overfilled optical system includes a number M of light sources, first, second, and third optical scanning lens systems, and a rotary polygon mirror. The number M of light sources emit a laser light beam. The first optical scanning lens system performs a coupling process to the laser light beam. The second optical scanning lens system collects light of the laser light beam in an approximately linear state extended in a main scanning direction. The rotary polygon mirror has a number N of deflective reflection surfaces for deflecting the laser light beam. The third optical scanning lens system gathers the laser light beam from the rotary polygon mirror to form a beam spot on an imaging surface. In this optical scanning apparatus, the predetermined number M satisfies a condition:

$3 \times R_p/R_{max} \geq M \geq R_p/R_{max}$, wherein $R_p$ and $R_{max}$ are defined as:

$R_p = (D_{pi}/25.4) \times (260 \times P_{pm})/N$, and $R_{max} = (5.4 \times 10^6) \times \sqrt{\{N^{16}/(A^4 \times t)\}}$, respectively.

32 Claims, 8 Drawing Sheets

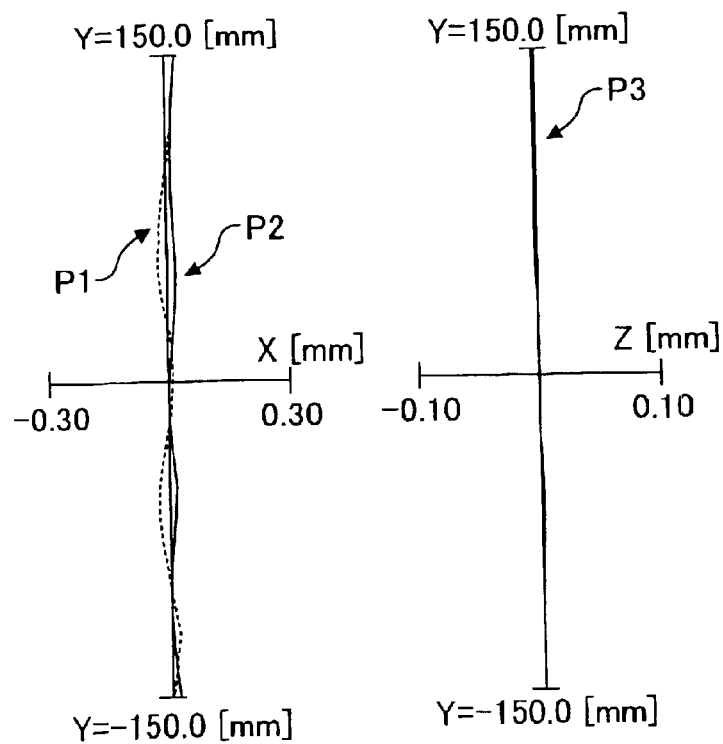
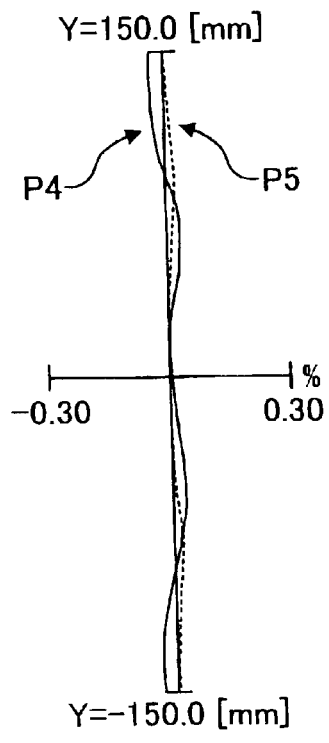
FIG. 2A  FIG. 2B  FIG. 2C

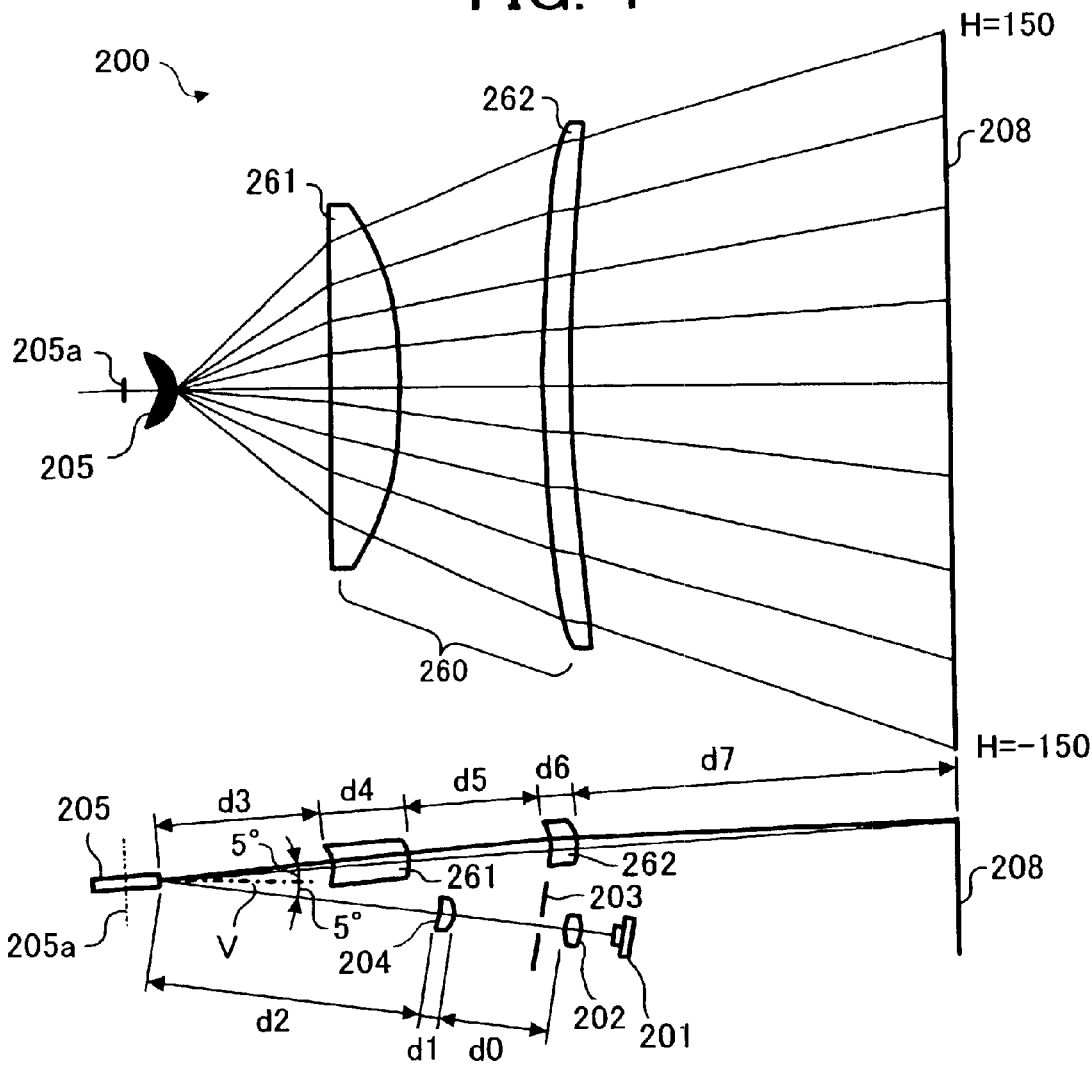
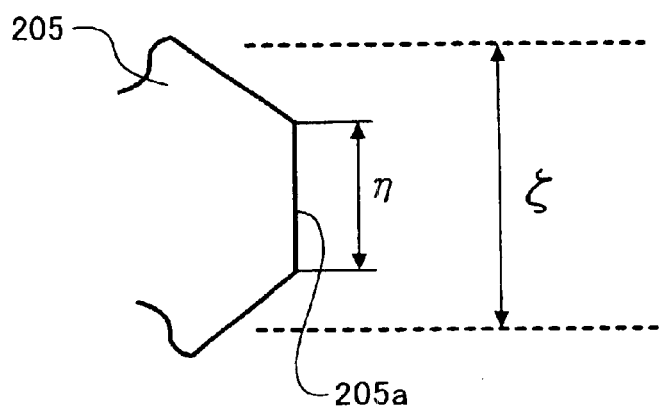
FIG. 5

METHOD AND APPARATUS FOR OPTICAL SCANNING CAPABLE OF PERFORMING A HIGH SPEED AND HIGH PIXEL DENSITY SCANNING

BACKGROUND OF THE INVENTION

1. Field of the Invention

The present invention relates to a method and apparatus for optical scanning, and more particularly to a method and apparatus for optical scanning capable of performing a high speed and high pixel density scanning.

2. Discussion of the Background

In an image forming apparatus such as a digital copying machine, a laser printer, or the like, a background optical scanning apparatus for generating a scanning laser light beam is generally used. The background optical scanning apparatus has a rotary polygon mirror configured to be rotated to sequentially deflect a laser light beam by reflection and to cause the laser light beam to scan a charged imaging surface of a photosensitive member. By continuing the scanning, an electrostatic latent image is reproduced on the imaging surface.

A recent demand for a high image density and a high speed with respect to the digital copying machines and the laser printers has been addressed mostly by increasing a rotational seed of the rotary polygon mirror and/or by changing to a multi-beam system by increasing a number of light sources of the background optical scanning apparatus.

When the speed of the rotary polygon mirror is indiscriminately increased, however, it may cause various drawbacks such as a generation of noise and vibration, an increase of electric consumption, etc. An indiscriminate change to a multi-beam system may also cause various drawbacks such as an increase of cost for the light source, variations in synchronization of the multiple beams, and so on. In particular, variations in pitch among the multiple beams may cause displacements of colors in an image.

Therefore, the present inventors have recognized that the background optical scanning apparatus has a need to be improved in the rotational speed of the rotary polygon mirror and the change to the multi-beams system with keeping an appropriate balance therebetween.

Further, the background optical scanning apparatus having a beam spot of from approximately 60 μm to approximately 70 μm causes the following problems with increasing image density. For example, at a high density of 1200 dpi or more, a pixel pitch is reduced to 21 μm, which is smaller than the above-mentioned beam spot, causing an excessive overlapping between an adjacent two image dots. As a result, a halftone reproducibility in a gray-scale image such as a photo image is degraded.

For another example, with a larger beam spot, an energy density in the beam power running on the photosensitive member is decreased and consequently a potential of the electrostatic latent image formed on the surface of the photosensitive member becomes unstable. This may cause a difficulty in developing a single dot image with toner in the developing process, which is apt to be apparent particularly when the developing conditions are changed over time and may cause a degradation of an image granularity.

These problems with increasing image density may be effectively avoided by reducing the beam spot to 50 μm or smaller.

To reduce the beam spot, however, a size of a laser light beam entering a scanning lens needs to be larger to increase a numerical aperture (NA) indicating an opening efficiency. Accordingly, a width of the laser light beam entering a deflective reflection surface of a rotary polygon mirror is increased and, as a result, a radius of an inscribed circle with respect to the deflective reflection surfaces of the rotary polygon mirror needs to be increased. However, when a radius of an inscribed circle is made larger, an air resistance is increased and various problems, such as a generation of a wind noise, vibration, jitter, etc., an increase of electric consumption, and so on, may occur particularly when the rotary polygon mirror is rotated at a high speed.

Therefore, a revolution number of the rotary polygon mirror is needed to be suitably determined to avoid the above-described problems when a radius of an inscribed circle is made larger.

The deflective scanning method by the optical scanning system can be grouped into an underfilled optical system and an overfilled optical system. The underfilled optical system, which is most-widely used, is provided with an aperture between a light source and a rotary polygon mirror serving as a light deflection device, in which a deflective reflection surface of the rotary polygon mirror is wider than a size of the light beam exiting from the aperture. That is, the underfilled optical system satisfies a relationship of:

$$\zeta < \eta,$$

wherein $\zeta$ represents a size of the light beam and $\eta$ represents a width of a deflective reflection surface of the rotary polygon mirror.

The underfilled optical system has an advantage in making a smaller beam spot while being resistant to a generation of bend in the scanning line. The underfilled optical system, however, has a drawback of increasing a radius of an inscribed circle with respect to the deflective reflection surfaces of the rotary polygon mirror. That is, the inscribed circle radius, which already has a relatively large size since it is made larger than the entry beam spot size, is further increased when a number of the deflective reflection surfaces of the rotary polygon mirror is increased. Therefore, there is a limit in increasing the speed of the rotary polygon mirror due to the above-mentioned wind noise.

On the other hand, the overfilled optical system has slowly been used as a system with the advantage of increasing the speed of the rotary polygon mirror. This is because the overfilled optical system uses the deflective reflection surfaces as the actual aperture and has the laser light beam spot that enters the deflective reflection surface larger than the size of the deflective reflection surface.

In the overfilled optical system, a reduction of the inscribed circle radius with respect to the deflective reflection surfaces of the rotary polygon mirror and an increase of the number of the deflective reflection surfaces of the rotary polygon mirror may be achieved in a relatively easy manner. Therefore, the overfilled optical system has an advantage in increasing the speed of the rotary polygon mirror.

However, the overfilled optical system generally has the following drawbacks relative to the underfilled optical system. As one example of a drawback, the laser light beam needs to have a tilt angle in the sub-scanning direction to enter the deflective reflection surface of the rotary polygon mirror with a beam axis towards the rotational center of the rotary polygon mirror. Because of this, a tangential coma may be generated. Therefore, the overfilled optical system has a difficulty in reducing the diameter of the laser light beam spot and is consequently apt to cause bend in the scanning line.

For another example of a drawback, an aperture diameter in the main scanning direction and a light amount are varied by the light deflection in the overfilled optical system. Due to this, an angle of field may not be increased. As a result, a light path becomes longer, which makes the optical scanning apparatus large.

As described above, the underfilled and overfilled optical systems have advantages and the disadvantages opposed to each other. In each system, it is possible to realize an optical system having merits in a manufacturing cost, an electric consumption, a noise, and a beam spot reduction by optimizing the revolution number of the rotary polygon mirror and the beam number generated by the light source.

SUMMARY OF THE INVENTION

In view of the foregoing, it is an object of the present invention to provide a novel optical scanning apparatus that performs a high speed and high pixel density scanning.

Another object of the present invention is to provide a novel optical scanning method that performs a high speed and high pixel density scanning.

Another object of the present invention is to provide a novel image forming apparatus that performs a high speed and high pixel density scanning.

To achieve the above-mentioned and other objects, in one example, a novel optical scanning apparatus using an underfilled optical system includes a predetermined number M of light sources, a first optical scanning lens system, a second optical scanning lens system, a rotary polygon mirror, and a third optical scanning lens system. The predetermined number M of light sources emit a laser light beam. The first optical scanning lens system is configured to perform a coupling process relative to the laser light beam emitted from the predetermined number M of light sources. The second optical scanning lens system is configured to gather light of the laser light beam from the first optical scanning lens system in an approximately linear state extended in a main scanning direction. The rotary polygon mirror has a predetermined number N of deflective reflection surfaces and is configured to receive and deflect the laser light beam gathered in the approximately linear state. The third optical scanning lens system is configured to gather the deflected laser light beam from the rotary polygon mirror to form a beam spot on an imaging surface. In this optical scanning apparatus, the predetermined number M satisfies a condition:

$$3 \times R_p/R_{max} \geq M \geq R_p/R_{max},$$

wherein $R_p$ and $R_{max}$ are defined as:

$$Rp \equiv (D_{pi}/25.4) \times (260 \times P_{pm})/N,$$

$$R_{max} \equiv (5.4 \times 10^6) \times \sqrt{\{N^{1.6}/(A^4 \times t)\}}, \text{ respectively,}$$

wherein M is greater than two, $R_p$ is a revolution number ($r_{pm}$) of the rotary polygon mirror in a single beam mode, $R_{max}$ is a maximum revolution number ($r_{pm}$) of the rotary polygon mirror, $D_{pi}$ is a pixel density ($d_{pi}$) in a sub-scanning direction, $P_{pm}$ is a print speed (ppm) expressed in a number of A4-sized print pages in a landscape orientation, N is a number of the deflective reflection surfaces of the rotary polygon mirror, A is a radius (mm) of an inscribed circle with respect to the deflective reflection surfaces of the rotary polygon mirror, and t is a thickness (mm) of each deflective reflection surface of the rotary polygon mirror.

A diameter $\omega_m$ of the beam spot in the main scanning direction, formed on the imaging surface by the third optical scanning lens system, may be a $1/e^2$ diameter and is equal to or smaller than 50 μm, and the radius A of the inscribed circle with respect to the deflective reflection surfaces of the rotary polygon mirror may satisfy a condition:

$$A \geq (0.76 \times f_m \times \lambda/\omega_m)/\tan\{(180°/N)-(\theta/2)\},$$

wherein λ (mm) is a central wave length of the light source, $f_m$ (mm) is a focal distance of the third optical scanning lens system in the main scanning direction, and θ is a half field angle of the third optical scanning lens system, including a synchronizing laser light beam.

In another example, a novel optical scanning apparatus using an overfilled optical system includes a predetermined number M of light sources, a first optical scanning lens system, a second optical scanning lens system, a rotary polygon mirror, and a third scanning lens system. The predetermined number M of light sources emit a laser light beam. The first optical scanning lens system is configured to perform a coupling process relative to the laser light beam emitted from the predetermined number M of light sources. The second optical scanning lens system is configured to gather light of the laser light beam from the first optical scanning lens system in an approximately linear state extended in a main scanning direction. The rotary polygon mirror has a predetermined number N of deflective reflection surfaces and is configured to receive and deflect the laser light beam gathered in the approximately linear state. The third optical scanning lens system is configured to gather the deflected laser light beam from the rotary polygon mirror to form a beam spot on an imaging surface. In this novel optical scanning apparatus, the predetermined number M satisfies a condition:

$$3 \times R_p/R_{max} \geq M \geq R_p/R_{max},$$

wherein $R_p$ and $R_{max}$ are defined as:

$$Rp \equiv (D_{pi}/25.4) \times (260 \times P_{pm})/N,$$

$$R_{max} \equiv (3.8 \times 10^6) \times \sqrt{\{N^{1.6}/(A^4 \times t)\}}, \text{ respectively,}$$

wherein M is greater than two, $R_p$ is a revolution number (rpm) of the rotary polygon mirror in a single beam mode, $R_{max}$ is a maximum revolution number (rpm) of the rotary polygon mirror, $D_{pi}$, is a pixel density (dpi) in a sub-scanning direction, $P_{pm}$ is a print speed (ppm) expressed in a number of A4-sized print pages in a landscape orientation, N is a number of the deflective reflection surfaces of the rotary polygon mirror, A is a radius (mm) of an inscribed circle with respect to the deflective reflection surfaces of the rotary polygon mirror, and t is a thickness (mm) of each deflective reflection surface of the rotary polygon mirror.

A diameter $\omega_m$ of the beam spot in the main scanning direction, formed on the imaging surface by the third optical scanning lens system, may be a $1/e^2$ diameter and is equal to or smaller than 50 μm, and the radius A of the inscribed circle with respect to the deflective reflection surfaces of the rotary polygon mirror may satisfy a condition:

$$A \geq (0.76 \times f_m \times \lambda/\omega_m)/\tan(180°/N),$$

wherein λ (mm) is a central wave length of the light source, $f_m$ (mm) is a focal distance of the third optical scanning lens system in the main scanning direction, and θ is a half field angle of the third optical scanning lens system, including a synchronizing laser light beam.

The predetermined number M of light sources may be made of a monolithic semiconductor laser array.

The predetermined number M of light sources may be packaged in a single light source unit and light rays emitted by the light sources are synthesized to a single light beam.

The rotary polygon mirror may be driven by an air bearing motor.

Each of the diameter $\omega_m$ in the main scanning direction and a diameter in a sub-scanning direction with respect to the beam spot formed on the imaging surface by the third optical scanning lens system may be a $1/e^2$ diameter and equal to or smaller than 50 μm.

The third optical scanning lens system may include at least two optical devices that include at least one surface having a non-circular-arc shape in the main scanning and sub-scanning directions.

To achieve the above-mentioned and other objects, in one example, a novel optical scanning method using an underfilled optical system includes the steps of emitting, performing, collecting, rotating, and gathering. The emitting step emits a laser light beam with a predetermined number M of light sources. The performing step performs a coupling process with a first optical scanning lens system relative to the laser light beam emitted from the predetermined number M of light sources. The collecting step collects light of the laser light beam from the first optical scanning lens system in an approximately linear state extended in a main scanning direction using a second optical scanning lens system. The rotating step rotates a predetermined number N of deflective reflection surfaces of a rotary polygon mirror to deflect the laser light beam gathered in the approximately linear state. The gathering step gathers the deflected laser light beam deflected by the deflective reflection surfaces of the rotary polygon mirror to form a beam spot on an imaging surface using a third optical scanning lens system. In this novel method, the predetermined number M satisfies a condition:

$$3 \times R_p/R_{max} \geq M \geq R_p/R_{max},$$

wherein $R_p$ and $R_{max}$ are defined as:

$$Rp \equiv (D_{pi}/25.4) \times (260 \times P_{pm})/N,$$

$$R_{max} \equiv (5.4 \times 10^6) \times \sqrt{\{N^{1.6}/(A^4 \times t)\}}, \text{ respectively,}$$

wherein M is greater than two, $R_p$ is a revolution number (rpm) of the rotary polygon mirror in a single beam mode, $R_{max}$ is a maximum revolution number (rpm) of the rotary polygon mirror, $D_{pi}$ is a pixel density (dpi) in a sub-scanning direction, $P_{pm}$ is a print speed (ppm) expressed in a number of A4-sized print pages in a landscape orientation, N is a number of the deflective reflection surfaces of the rotary polygon mirror, A is a radius (mm) of an inscribed circle with respect to the deflective reflection surfaces of the rotary polygon mirror, and t is a thickness (mm) of each deflective reflection surface of the rotary polygon mirror.

A diameter $\omega_m$ of the beam spot in the main scanning direction, formed on the imaging surface by the third optical scanning lens system, may be a $1/e^2$ diameter and is equal to or smaller than 50 μm, and the radius A of the inscribed circle with respect to the deflective reflection surfaces of the rotary polygon mirror may satisfy a condition:

$$A \geq (0.76 \times f_m \times \lambda/\omega_m)/\tan\{(180°/N)-(\theta/2)\},$$

wherein λ (mm) is a central wave length of the light source, $f_m$ (mm) is a focal distance of the third optical scanning lens system in the main scanning direction, and θ is a half field angle of the third optical scanning lens system, including a synchronizing laser light beam.

In another example, a novel optical scanning method using an overfilled optical system includes the steps of emitting, performing, collecting, rotating, and gathering. The emitting step emits a laser light beam with a predetermined number M of light sources. The performing step performs a coupling process using a first optical scanning lens system relative to the laser light beam emitted from the predetermined number M of light sources. The collecting step gathers light of the laser light beam from the first optical scanning lens system in an approximately linear state extended in a main scanning direction using a second optical scanning lens system. The rotating step rotates a predetermined number N of deflective reflection surfaces of a rotary polygon mirror to deflect the laser light beam gathered in the approximately linear state. The gathering step gathers the laser light beam deflected by the rotary polygon mirror to form a beam spot on an imaging surface using a third optical scanning lens system. In this novel method, the predetermined number M satisfies a condition:

$$3 \times R_p/R_{max} \geq M \geq R_p/R_{max},$$

wherein $R_p$ and $R_{max}$ are defined as:

$$Rp \equiv (D_{pi}/25.4) \times (260 \times P_{pm})/N,$$

$$R_{max} \equiv (3.8 \times 10^6) \times \sqrt{\{N^{1.6}/(A^4 \times t)\}}, \text{ respectively,}$$

wherein M is greater than two, $R_p$ is a revolution number (rpm) of the rotary polygon mirror in a single beam mode, $R_{max}$ is a maximum revolution number (rpm) of the rotary polygon mirror, $D_{pi}$ is a pixel density (dpi) in a sub-scanning direction, $P_{pm}$ is a print speed (ppm) expressed in a number of A4-sized print pages in a landscape orientation, N is a number of the deflective reflection surfaces of the rotary polygon mirror, A is a radius (mm) of an inscribed circle with respect to the deflective reflection surfaces of the rotary polygon mirror, and t is a thickness (mm) of each deflective reflection surface of the rotary polygon mirror.

A diameter $\omega_m$ of the beam spot in the main scanning direction, formed on the imaging surface by the third optical scanning lens system, may be a $1/e^2$ diameter and is equal to or smaller than 50 μm, and the radius A of the inscribed circle with respect to the deflective reflection surfaces of the rotary polygon mirror may satisfy a condition:

$$A((0.76 \times fm \times (/(m)/\tan(180/N)),$$

wherein λ (mm) is a central wave length of the light source, fm (mm) is a focal distance of the third optical scanning lens system in the main scanning direction, and θ is a half field angle of the third optical scanning lens system, including a synchronizing laser light beam.

The predetermined number M of light sources may be made of a monolithic semiconductor laser array.

The predetermined number M of light sources may be packaged in a single light source unit and light rays emitted by the light sources are synthesized to a single light beam.

The deflective reflection surfaces may be driven by an air bearing motor.

Each of the diameter ωm in the main scanning direction and a diameter in the sub-scanning direction with respect to the beam spot formed on the imaging surface by the third optical scanning lens system may be a 1/e2 diameter and is equal to or smaller than 50 μm.

The third optical scanning lens system may include at least two optical devices that include at least one surface having a non-circular-arc shape in the main scanning and sub-scanning directions.

In another example, a novel image forming apparatus that prints at a speed of 50 ppm or higher expressed in a number of A4-sized print pages in a landscape orientation and at a pixel density of 1200 dpi includes any one of the above-mentioned optical scanning apparatuses.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 2A–2C are graphs showing various optical properties of the optical scanning system of FIG. 1A;

FIG. 4 is an illustration for explaining an optical scanning system according to another preferred embodiment of the present invention;

FIG. 5 is an illustration for explaining an overfilled laser light system;

DETAILED DESCRIPTION OF PREFERRED EMBODIMENTS

Figure 1A:
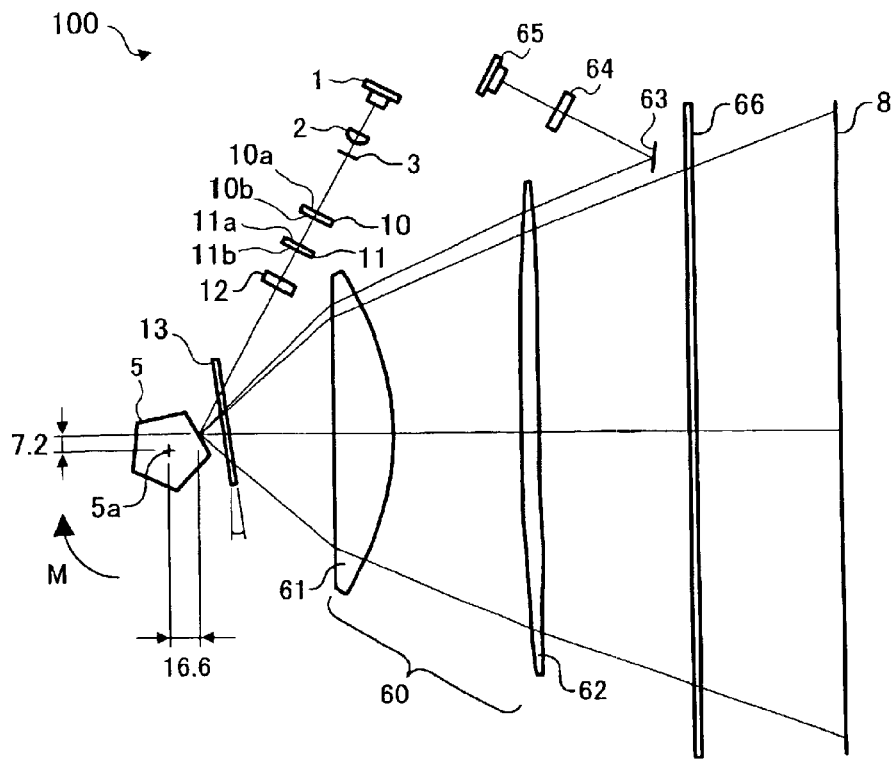
FIG. 1A is a schematic view of an optical scanning system according to a preferred embodiment of the present invention, seen in a direction corresponding to a main scanning.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Figure 1B:
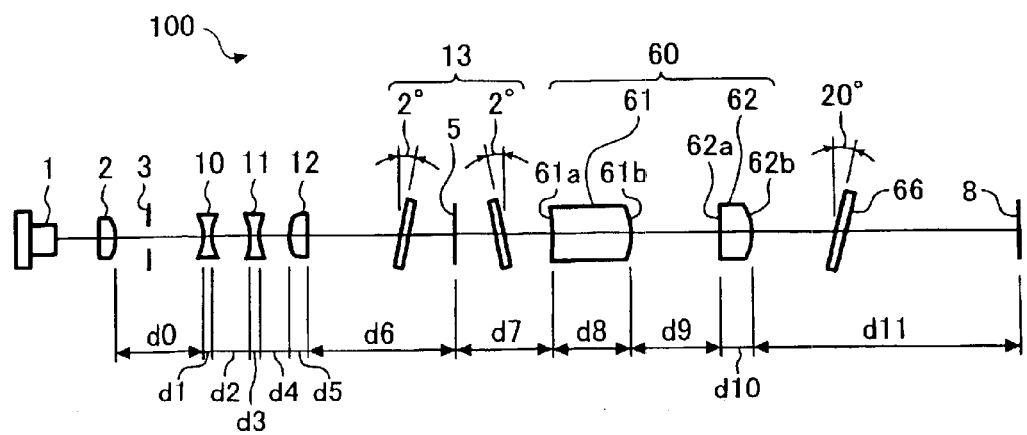
FIG. 1B is a schematic view of the optical scanning system of FIG. 1A, seen in a direction corresponding to a sub-scanning.

Referring now to the drawings, wherein like reference numerals designate identical or corresponding parts throughout the several views, particularly to FIGS. 1A and 1B, an optical scanning system 100 according to a preferred embodiment of the present invention is explained. FIG. 1A is a view of the optical scanning system 100 seen in a direction corresponding to a main scanning direction and FIG. 1B is a view seen in a direction corresponding to a sub-scanning direction. The optical scanning system 100 is an exemplary underfilled type optical scanning system.

As shown in FIG. 1A, the optical scanning system 100 includes a light source 1, a coupling lens 2, an aperture 3, a rotary polygon mirror 5, an imaging surface 8, resin-made lenses 10 and 11, a glass-made toroidal lens 12, a sound insulation glass 13, resin-made lenses 61 and 62, a mirror 63, a synchronizing lens 64, a photoreceptor 65, and a dust resistant glass 66. The coupling lens 2 is referred to as a first optical lens system. A set of the lenses 10–12 is referred to as a second optical lens system. A set of the resin-made lenses 61 and 62 is referred to as a third optical lens system 60. A set of the mirror 63, the synchronizing lens 64, and the photoreceptor 65 is referred to as an optical synchronizing system.

In the optical scanning system 100 of FIG. 1A, a light ray (i.e., a laser light beam) emitted from the light source 1 is coupled by the coupling lens 2 to become a desired light ray of a desired state. In this example, the laser light beam is coupled into an approximate parallel laser light beam. The light source 1 may be a semiconductor laser (LD), e'.g., a laser diode, a semiconductor laser array (LDA) having a plurality of light emitting points, a multiple-beam light source generating multiple laser light beams using a plurality of LDs and prisms, for example, and so forth.

The coupling lens 2 may be a single aspheric surface lens and a wavefront aberration of the single coupling lens 2 is desirably corrected. The laser light beam traveling through the coupling lens 2 passes through a slit of the aperture 3 and then enters the second optical lens system (i.e., the resin-made lens 10, the resin-made lens 11, and the glass-made toroidal lens 12).

The resin-made lens 10 has an input surface 10a in a spherical shape that provides the input surface 10a with a negative power in all directions including main scanning and sub-scanning directions, and an output surface 10b has a cylindrical shape that provides the output surface 10b with a negative power in the sub-scanning direction. Also, the resin-made lens 11 has an input surface 11a and an output surface 11b both provided with a negative power in the sub-scanning direction.

The laser light beam travels through the resin-made lenses 10 and 11, and then enters the glass-made toroidal lens 12, which also has an input surface and an output surface. The glass-made toroidal lens 12 maintains the collimation of the laser light beam in the main scanning direction and condenses the laser light beam in the sub-scanning direction. Therefore, when the laser light beam that has passed through the glass-made toroidal lens 12 enters a deflective reflection surface of the rotary polygon mirror 5, a shape of the laser light beam focused on the deflective reflection surface is in an approximately linear state in the main scanning direction and in a beam spot state in the sub-scanning direction.

The rotary polygon mirror 5 and a driving motor (not shown) for driving the rotary polygon mirror 5 are accommodated by a housing (not shown) to which the sound insulation glass 13 is mounted in a light path of the above-described laser light beam from the glass-made toroidal lens 12 to the rotary polygon mirror 5. The rotary polygon mirror 5 deflects the entered laser light beam by reflection, as shown in FIG. 1A. When the rotary polygon mirror 5 is rotated in a direction M, the deflective reflection surface of the rotary polygon mirror 5 sequentially changes its angle relative to the laser light beam and the deflection angle of the laser light beam is sequentially changed. Thus, the laser light beam is deflected and is consequently brought to scan an area in a predetermined angular range. After being deflected, the laser light beam travels in a straight line to pass through the third optical lens system 60 and falls on the imaging surface 8.

The third optical lens system 60 corrects for the laser light beam to correct bends of an image surface in the main scanning and sub-scanning directions and an fθ (ef-theta) characteristic with respect to an image to be formed on the imaging surface 8 by the scanning laser beam. The laser light beam passing through the first and second scan-imaging devices forms a light spot on the imaging surface 8 and sequentially moves in the main scanning direction as the deflective reflection surface of the rotary polygon mirror 5 is moved by the rotation of the rotary polygon mirror 5.

The imaging surface 8 may be a surface of an image carrying member made of a photosensitive material and having a drum shape or a belt shape. The dust resistant glass 66 is mounted between the resin-made lens 62 and the imaging surface 8 to the housing (not shown) of this optical scanning system 100.

The radius of the laser light beam output from the second optical lens system (i.e., the lenses 10–12) is smaller than the area of the deflective reflection surface of the rotary polygon mirror 5, which is the reason that the optical scanning system 100 is referred to as an underfilled optical system. In this system, the laser light beam output from the second optical lens system travels towards the rotary polygon mirror 5 to enter a rotary center 5a thereof.

The optical synchronizing system (i.e., the mirror 63, the synchronizing lens 64, and the photoreceptor 65) detects the laser light beam iminging on an external point and before the image scanning area relative to the imaging surface 8 and converts the detected laser light beam to a synchronizing signal. The mirror 63 reflects the laser light beam passing through the third optical lens system 60 to an external point and before the image scanning area to the optical synchronizing lens 64, which converges the laser light beam and passes the converged laser light beam therethrough. The photoreceptor 65 receives the laser light beam passing through the optical synchronizing lens 64 and outputs a synchronizing signal. Thus, the optical synchronizing system generates a synchronizing signal used for a synchronization of the scanning operation.

The resin-made lenses 61 and 62 of the third optical lens system 60 may be affected by a temperature variation and consequently cause variations in bend in imaging surfaces of the resin-made lenses 61 and 62 in both main scanning and sub-scanning directions. The variations in the imaging surface bend in the main scanning direction are corrected by the variations in the negative power in the main scanning direction given to the input surface 10a of the resin-made lens 10 of the second optical lens system.

The variations in the imaging surface bend in the sub-scanning direction are corrected by the variations in the negative power of the output surface 10b of the resin-made lens 10 and the variations in the negative powers of the input surface 11a and the output surface 11b of the resin-made lens 11. These input and output surfaces of both resin-made lenses 10 and 11 have shapes of a non-circular-arc and a circular-arc that are expressed by the following equations.

The shape in the main scanning plane is non-circular-arc and a depth X(Y) in the light axis direction with respect to the non-circular-arc in the main scanning direction can be expressed as:

$$X(Y)=(Y^2/R_m)/[1+\sqrt{1-(1+K)(Y/R_m)^2}]+a1*Y+a2*Y2+a3*Y3+a4*Y4+a5*Y5+a6*Y6+\ldots,$$

wherein $C_m$ represents a radius of a paraxial curvature at the light axis in the main scanning plane, Y represents a distance from the light axis in the main scanning direction, K represents a circular cone constant, and $a_1, a_2, a_3, a_4,$ and so on represent coefficients for higher-ordered terms of Y.

When a value other than 0 is substituted for the coefficients for the odd-numbered order terms of Y, which are $a_1, a_3, a_5,$ and so on, the surface shape becomes asymmetric in the main scanning direction. In this example, 0 is substituted for $a_1, a_3, a_5,$ and so on, and a value other than 0 is placed for $a_2, a_4, a_6,$ and so on, which are the coefficients for the even-numbered order terms of Y, so that the surface shape becomes symmetric in the main scanning direction.

The sub-scanning curvature varying in accordance with the position Y in the main scanning direction is expressed as:

$$C_s(Y)=1/R_s(0)+B_1*Y+B_2*Y^2+B_3*Y^3+B_4*Y^4+B_5*Y^5+\ldots.$$

When a value other than 0 is substituted for the coefficients for the odd-numbered order terms of Y, which are $B_1, B_3, B_5,$ and so on, the radius of the curvature in the sub-scanning direction becomes asymmetric in the main scanning direction.

On the other hand, a lens surface shape X(Y,Z) can generally be expressed as;

$$X(Y,Z) = \frac{C_m \cdot Y^2}{1+\sqrt{1-(1+K)C_m^2 \cdot Y^2}} + \sum_{n=1}^{p} a_h \cdot Y^n +$$

$$\frac{C_S(Y) \cdot Z^2}{1+\sqrt{1-(1+K_Z(Y))C_S^2(Y) \cdot Z^2}} + \sum_{j=1}^{r}\left(\sum_{h=0}^{q} d_{jh} \cdot Y^h\right) \cdot Z^j.$$

In this expression, the first and second terms express the above-described depth X(Y) in the light axis direction with respect to the non-circular-arc shape in the main scanning direction, and the third and fourth terms express a depth in the light axis direction with respect to a non-circular-arc shape in the sub-scanning direction. The fourth term represents amounts of correction for high-ordered terms of Y with respect to an aspheric surface, and is expressed by a function $f_{SAG}(Y,Z)$. The function $f_{SAG}(Y,Z)$ can be expanded as:

$$F_{SAG}(Y,Z) = (F_0 + F_1*Y + F_2*Y^2 + F_3*Y^3 + F_4*Y^4 + \cdots)*Z +$$
$$(G_0 + G_1*Y + G_2*Y^2 + G_3*Y^3 + G_4*Y^4 + \cdots)*Z^2 +$$
$$(H_0 + H_1*Y + H_2*Y^2 + H_3*Y^3 + H_4*Y^4 + \cdots)*Z^3 +$$
$$(I_0 + I_1*Y + I_2*Y^2 + I_3*Y^3 + I_4*Y^4 + \cdots)*Z^4 +$$
$$(J_0 + J_1*Y + J_2*Y^2 + J_3*Y^3 + J_4*Y^4 + \cdots)*Z^5 +$$
$$\cdots + \cdots.$$

Here, Y represents a distance in the main scanning direction, Z represents a direction corresponding to the sub-scanning, $C_m$ or $1/R_m$ represents a paraxial curvature around a light axis in the main scanning corresponding direction, $C_s(0)$ or $1/R_s(0)$ represents a paraxial curvature around a light axis in the sub-scanning corresponding direction, $C_s(Y)$ represents a paraxial curvature in the sub-scanning corresponding direction at a position Y in the main scanning corresponding direction, and $K_z(Y)$ represents a circular cone constant expressing a quadratic curve in the sub-scanning corresponding direction at a position Y in the main scanning corresponding direction.

Further, $C_s(Y)$ and $K_z(Y)$ are expressed as:

$$C_s(Y)=1/R_s(0)+B_1*Y+B_2*Y^2+B_3*Y^3+B_4*Y^4+B_5*Y^5+\ldots,$$

and $$K_z(Y)=C_0+C_1*Y+C_2*Y^2+C_3*Y^3+C_4*Y^4+C_5*Y^5+\ldots,\text{ respectively}$$

When a value other than 0 is substituted for the coefficients for the odd-numbered order terms of Y, which are $B_1$, $B_3$, $B_5$, and so on, the radius of the curvature in the sub-scanning direction becomes asymmetric in the main scanning direction. Likewise, when a value other than 0 is substituted for the coefficients for the odd-numbered order terms of Y representing an amount of non-circular-arc, which are $C_1$, $C_3$, $C_5$, and so on, or $F_1$, $F_3$, $F_5$, and so on, or $G_1$, $G_3$, $G_5$, and so on, the amount of the non-circular-arc in the sub-scanning direction becomes asymmetric in the main scanning direction.

The above-described components included in the optical scanning system 100 are provided with the following specific profiles. The light source 1 uses a four-channel LD (laser diode) array generating a plurality of laser light beams each having a wave length of 780 nm at an image density of 1200 dpi, for example. The position of the four-channel LD array is adjusted by a rotation of 12.4° about the light axis, for example.

The coupling lens 2 has a focal distance of 27 mm and performs collimation as a coupling operation, for example. The aperture 3 decreases the diameter of the laser beam spot on the light axis at an image density of 1200 dpi to approximately 30 μm in both main scanning and sub-scanning directions, for example. The aperture 3 is spaced by 4.5 mm from the coupling lens 2 and has a rectangular-shaped opening of 8.2 mm in the main scanning direction and 1.6 mm in the sub-scanning direction, for example.

The rotary polygon mirror 5 includes five deflective reflection surfaces and has an inscribed circle having a radius of 18 mm, and each deflective reflection surface has a short side of 3 mm, for example. The sound insulation glass 13 is made of float glass and has a thickness of 1.9 mm, for example. The sound insulation glass 13 is tilted by 2° in the sub-scanning direction and by 8° in the main scanning direction to prevent a ghost light, for example.

The dust resistant glass 66 is made of float glass and has a thickness of 1.9 mm, for example. The dust resistant glass 66 is tilted by 20° in the sub-scanning direction to prevent a ghost light, for example. The photoreceptor 65 of the optical synchronizing system may include a photodiode and is mounted at a position substantially equivalent to the imaging position. The optical synchronizing lens 64 of the optical synchronizing system is a cylinder lens having a curvature in the sub-scanning direction.

The optical synchronizing system performs a synchronization with two points of an image having a height of ±170 mm, for example. An angle formed by the laser light beam from the light source 1 with the light axis of the optical scanning system is 60°, for example. An effective recording width is ±150 mm, for example. An angle of field is ±37.7° with respect to the effective recording width and ±42.7° with respect to the synchronizing image height, for example.

For the sake of convenience, input and output surfaces of each optical device are given respective reference numerals (e.g., 10*a* for the input surface and 10*b* for the output surface of the resin-made lens 10) as needed. As shown in FIG. 1B, distances between adjacent input and output surfaces of the optical devices are defined as $d_n$, where n varies from 0 to 11. For example, a distance between an output surface of the coupling lens 2 and the input surface 10*a* of the resin-made lens 10 is $d_0$, a thickness of the resin-made lens 10 is $d_1$, a distance between the output surface 10*b* of the resin-made lens 10 and the input surface 11*a* of the resin-made lens 11 is $d_2$, and so on.

The distance $d_0$ is set to 47 mm, $d_1$ to 3 mm, $d_2$ to 9.2 mm, $d_3$ to 3 mm, $d_4$ to 8.15 mm, $d_5$ to 6 mm, and $d_6$ to 114 mm, for example.

The input surface 2*a* has a curvature radius of infinity, for example. The input surface 10*a* has a curvature radius of −18.486 mm in a non-spherical surface and of −119.97 mm in a spherical surface, for example. The output surface 10*b* has a curvature radius of infinity in the main scanning direction and of 16.4 mm in the sub-scanning direction, for example.

The input surface 11*a* has a curvature radius of infinity in the main scanning direction and of −16 mm in the sub-scanning direction, for example. The output surface 11*b* has a curvature radius of $1.0 \times 10^8$ mm in the main scanning direction and of 18.03 mm in the sub-scanning direction, that is, a non-circular-arc surface in the sub-scanning direction, for example. The input surface 12*a* has a curvature radius of infinity in the main scanning direction and of 13.54 mm in the sub-scanning direction, for example. The output surface 12*b* is spherical and has a curvature radius of −186 mm, for example.

The shape of the input surface 11*a* of the resin-made lens 11 is defined, for example, by the following factors and coefficients:

$R_m = 1.00 \times 10^8$;

$R_s(0) = -18.03$;

$a_4 = 1.287048 \times 10^{-7}$;

$a_6 = 1.615827 \times 10^{-9}$;

$C_0 = 3.681387 \times 10$;

$C_2 = 1.882281 \times 10^{-1}$;

$C_4 = 1.542188 \times 10^{-2}$;

$C_6 = -4.096661 \times 10^{-4}$;

$C_8 = 5.584789 \times 10^{-6}$;

$I_0 = 3.496085 \times 10^{-4}$;

$I_2 = -2.319818 \times 10^{-6}$;

$I_4 = -7.859564 \times 10^{-8}$;

$I_6 = 7.462640 \times 10^{-10}$;

$I_8 = 2.952126 \times 10^{-11}$;

$K_0 = 6.055635 \times 10^{-6}$;

$K_2 = -1.070845 \times 10^{-6}$;

$K_4 = -1.078958 \times 10^{-7}$;

$K_6 = 2.023609 \times 10^{-9}$; and $K_8 = -2.307748 \times 10^{-11}$.

The resin-made lenses 10 and 11 have a refractive index of 1.523978, for example, for light of a 780-nm wave length. The glass-made toroidal lens 12 has a refractive index of 1.733278, for example, for light of a 780-nm wave length.

Further, the distance $d_7$ is set to 71.6 mm, $d_8$ to 30 mm, $d_9$ to 66.3 mm, $d_{10}$ to 8.5 mm, and $d_{11}$ to 159.3 mm, for example.

Both resin-made lenses 61 and 62 have a refractive index of 1.523978, for example, for light of a 780-nm wave length at a temperature of 25° C.

The shape of the input surface 61*a* of the resin-made lens 61 is defined, for example, by the following factors and coefficients:

$Rm = -1030.233$;

$Rs(0) = -89.519$;

$Km = -4.041619 \times 102$;

$a4 = 6.005017 \times 10-8$;

$a6 = -7.538155 \times 10-13$;

$a8 = -4.036824 \times 10-16$;

$a10 = 4.592164 \times 10-20$;

$a12 = -2.396524 \times 10-24$;

$B1 = -9.317851 \times 10-6$;

$B2 = 3.269905 \times 10-6$;

$B3 = 4.132497 \times 10-9$;

$B4 = -4.207716 \times 10-10$;

$B5 = -1.170114 \times 10-12$;

$B6 = 4.370640 \times 10-14$;

$B7 = 2.347965 \times 10-16$;

$B8 = -6.212795 \times 10-18$;

$B9 = -3.967994 \times 10-20$;

$B10 = -3.873869 \times 10-21$;

$B11 = 3.816823 \times 10-24$; and $B12 = 4.535843 \times 10-25$.

The shape of the output surface 61b of the resin-made lens 61 is defined, for example, by the following factors and coefficients:

$R_m = -109.082$;

$R_s(0) = -110.881$;

$K_m = -5.427642 \times 10^{-1}$;

$a_4 = 9.539024 \times 10^{-8}$;

$a_6 = 4.882194 \times 10^{-13}$;

$a_8 = -1.198993 \times 10^{-16}$;

$a_{10} = 5.029989 \times 10^{-20}$;

$a_{12} = -5.654269 \times 10^{-24}$;

$B_2 = -3.652575 \times 10^{-7}$;

$B_4 = 2.336762 \times 10^{-11}$;

$B_6 = 8.426224 \times 10^{-14}$;

$B_8 = -1.026127 \times 10^{-17}$;

$B_{10} = -2.202344 \times 10^{-21}$; and $B_{12} = 1.224555 \times 10^{-26}$.

The shape of the input surface 62a of the resin-made lens 62 is defined, for example, by the following factors and coefficients:

$R_m = 1493.655$;

$R_s(0) = -70.072$;

$K_m = 5.479389 \times 10$;

$a_4 = -7.606757 \times 10^{-9}$;

$a_6 = -6.311203 \times 10^{-13}$;

$a_8 = 6.133813 \times 10^{-17}$;

$a_{10} = -1.482144 \times 10^{-21}$;

$a_{12} = 2.429275 \times 10^{-26}$;

$a_{14} = -1.688771 \times 10^{-30}$;

$B_2 = -8.701573 \times 10^{-8}$;

$B_4 = 2.829315 \times 10^{-11}$;

$B_6 = -1.930080 \times 10^{-15}$;

$B_8 = 2.766862 \times 10^{-20}$;

$B_{10} = 2.176995 \times 10^{-24}$; and $B_{12} = -6.107799 \times 10^{-29}$.

The shape of the output surface 62b of the resin-made lens 62, which is a non-circular-arc surface in the sub-scanning direction, is defined, for example, by the following factors and coefficients:

$R_m = 1748.584$;

$R_s(0) = -28.035$;

$K_m = -5.488740 \times 10^2$;

$a_4 = -4.978348 \times 10^{-8}$;

$a_6 = 2.325104 \times 10^{-12}$;

$a_8 = -7.619465 \times 10^{-17}$;

$a_{10} = 3.322730 \times 10^{-21}$;

$a_{12} = -3.571328 \times 10^{-26}$;

$a_{14} = -2.198782 \times 10^{-30}$;

$B_1 = -1.440188 \times 10^{-6}$;

$B_2 = 4.696142 \times 10^{-7}$, $B_3 = 1.853999 \times 10^{-11}$, $B_4 = -4.153092 \times 10^{-11}$, $B_5 = -8.494278 \times 10^{-16}$, $B_6 = 2.193172 \times 10^{-15}$, $B_7 = 9.003631 \times 10^{-19}$, $B_8 = -9.271637 \times 10^{-21}$, $B_9 = -1.32811 \times 10^{-22}$, $B_{10} = -1.409647 \times 10^{-24}$, $B_{11} = 5.520183 \times 10^{-27}$, $B_{12} = 4.513104 \times 10^{-30}$, $C_0 = -9.999999 \times 10^{-1}$;

$I_0 = -1.320849 \times 10^{-7}$;

$I_2 = -1.087674 \times 10^{-11}$;

$I_4 = -9.022577 \times 10^{-16}$;

$I_6=-7.344134\times10^{-20}$;

$K_0=9.396622\times10^{-9}$;

$K_2=1.148840\times10^{-12}$;

$K_4=8.063518\times10^{-17}$; and $K_6=-1.473844\times10^{-20}$.

FIG. 2A shows properties of bends in an image surface in the main scanning and sub-scanning directions of the optical scanning system 100 by letters P1 and P2, respectively. As shown in FIG. 2A, the bends in an image surface in both main scanning and sub-scanning directions are within a range of from −0.30 mm to 0.30 mm in a main scanning region of from −150 mm to 150 mm and are considered to be preferable.

In FIG. 2B, a property of bends in the scanning line is indicated by a letter P3, which is within a range of from −0.10 mm to 0.10 mm in the main scanning region of from −150 mm to 150 mm, and is considered to be preferable. Also, FIG. 2C shows properties of linearity and fθ (ef-theta) of the optical scanning system 100 by letters P4 and P5, respectively. As shown in FIG. 2C, the linearity and the fθ (ef-theta) are within a range of from −0.30% to 0.30% and are considered to be preferable.

Figure 3A:
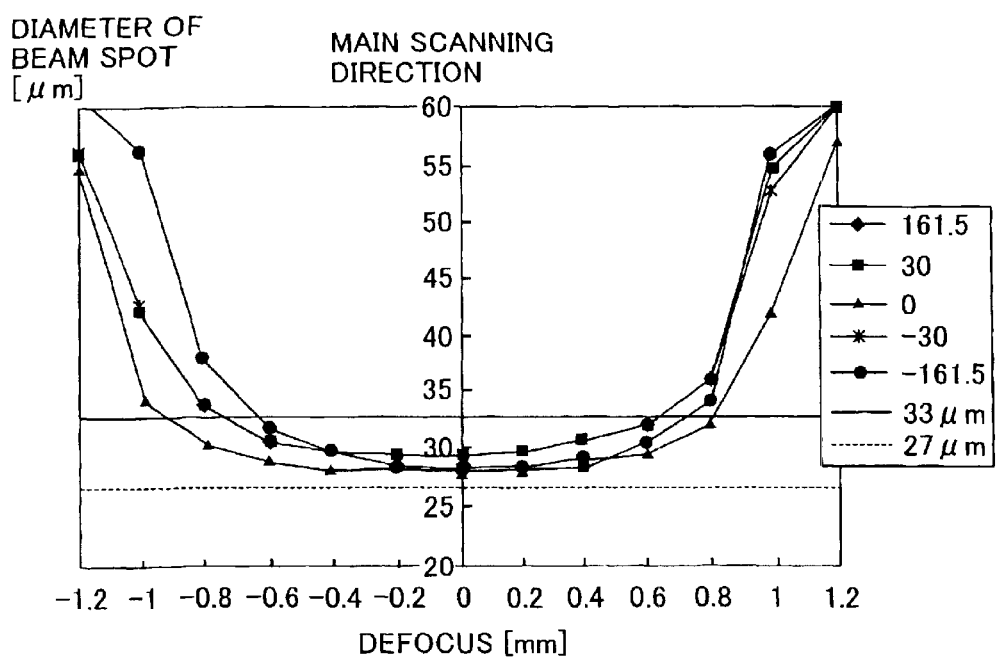
FIGS. 3A and 3B are graphs showing defocuses of the optical scanning system of FIG. 1A in the main scanning and sub-scanning directions.
Figure 3B:
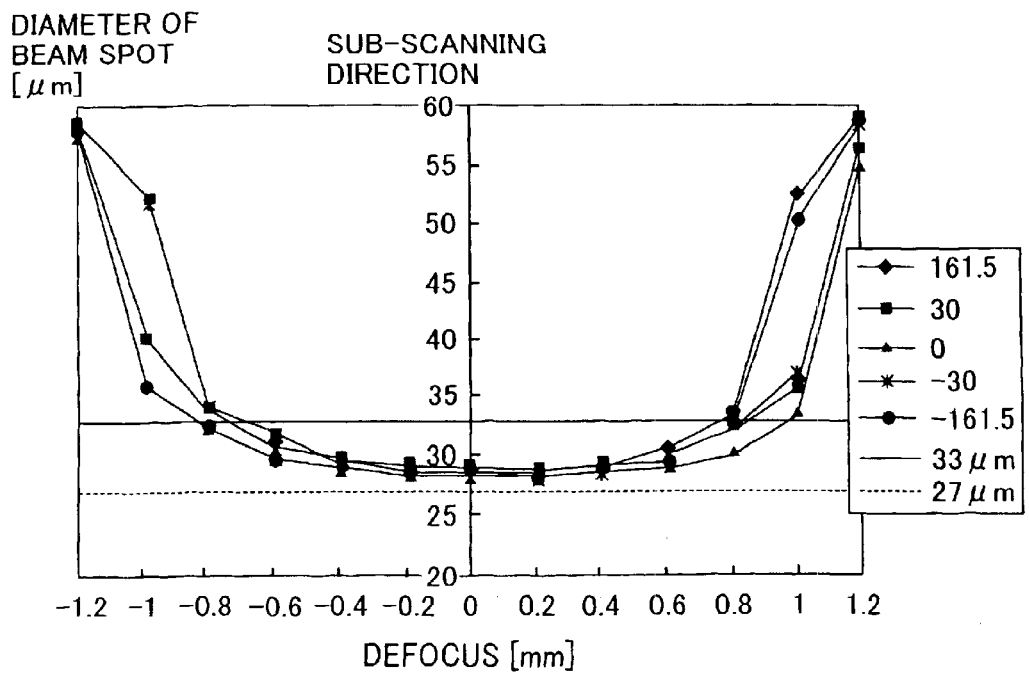

The above-structured optical scanning system 100 has properties of defocus in the main scanning direction, as shown in FIG. 3A, and in the sub-scanning direction, as shown in FIG. 3B.

Next, a description is made for an optimization of the number M with respect to multiple laser light beams to be used in place of a single laser light beam in the optical scanning system 100 that applies the underfilled optical system. As described earlier, when a radius of an inscribed circle with respect to the deflective reflection surfaces of the rotary polygon mirror is made larger, an air resistance is increased and various problems, such as a generation of a wind noise, vibration, jitter, etc., an increase of electric consumption, and so on, may occur particularly when the rotary polygon mirror is rotated at a high speed. Therefore, a revolution number of the rotary polygon mirror is needed to be suitably determined to avoid the above-described problems when a radius of an inscribed circle is made larger.

In general, an air resistance increases as a value approximately proportional to the fourth power of the inscribed circle radius A with respect to the deflective reflection surfaces of the rotary polygon mirror 5 and the thickness t of the rotary polygon mirror 5, and is inversely approximately proportional to the 1.6th power of the number M of the deflective reflection surfaces of the rotary polygon mirror 5 and the second power of the revolution number $R_p$ of the rotary polygon mirror 5. That is, a coefficient α of the air resistance can be expressed as:

$$\alpha \propto (A^4\times t)/(N^{1.6}\times R_p^2).$$

Based on this expression, the air resistance coefficient α is set to a value of $5.4\times10^6$ or smaller at the maximum revolution number $R_{max}$ of the rotary polygon mirror 5 to effectively reduce the above-mentioned problems associated with the wind noise, the vibration, the jitter, and the electric consumption. Accordingly, the maximum revolution number $R_{max}$ is expressed as:

$$R_{max}\equiv(5.4\times10^6)\times\sqrt{\{N^{1.6}/(A^4\times t)\}}.\text{ (rpm)}$$

On the other hand, when the pixel density and the print speed (expressed in a number of A4-sized print pages in a landscape orientation) are represented by $D_{pi}$ and $P_{pm}$, respectively, the revolution number Rp of the rotary polygon mirror 5 in the case of using a single laser light beam is expressed as:

$$Rp\equiv(D_{pi}/25.4)\times(260\times P_{pm})/N,\text{ (rpm)}$$

wherein spaces between adjacent recording sheets in the printing process are set to 50 mm.

In the optical scanning system 100, the number M of the multiple laser light beams is optimized on the basis of a ratio between $R_{max}$ and $R_p$ defined above. More specifically, the optical scanning system 100 can properly perform its optical scanning operation without causing the above-mentioned problems when the number M satisfies the following relationship:

$$3\times R_p/R_{max}\geq M\geq R_p/R_{max}.$$

When the number M is reduced below the lower limit of the above relationship, the revolution number of the rotary polygon mirror is excessively increased and consequently the wind noise, the vibration, the jitter, and the electric consumption become problematic. On the other hand, when the number M is increased above the upper limit of the above relationship, the laser light beam number is excessively increased and, as a result, the manufacturing costs and the beam control become serious problems.

The diameter A of the inscribed circle with respect to the deflective reflection surfaces of the rotary polygon mirror 5 directly contributes to a reduction of the air resistance. In the optical scanning system 100, the inscribed circle diameter A satisfies the following condition:

$$A\geq(0.76\times f_m\times\lambda/\omega_m)/\tan\{(180°/N)-(\theta/2)\},$$

wherein λ is the wave length of the light source 1, $f_m$ is the focal distance of the third optical scanning lens system 60 in the main scanning direction, $\omega_m$ represents a $1/e^2$ diameter of the laser light beam spot in the main scanning direction on the imaging surface 8, and θ is the half field angle of the third optical scanning lens system 60 including the synchronizing laser light beam. The diameter of the laser light beam spot in the main scanning direction on the imaging surface 8 is set to a diameter of the beam spot having an intensity of a $1/e^2$ relative to a line spread function (LSF) at a point of an image height of 0. By satisfying the above condition, the diameter A is not unnecessarily set to a large value even when the laser light beam spot is made small. Therefore, it facilitates to increase the speed of the rotary polygon mirror 5.

In the optical scanning system 100, the focal distance $f_m$ is set to 227.9 mm, the wave length λ is set to 780 nm, the beam spot diameter m is set to 30 μm, the deflective reflection surface number N is set to 5, and the half field angle relative to the height of the synchronized image is set to ±42.7°. Accordingly, the inscribed circle diameter A is calculated as below:

$$A\geq(0.76\times227.9\times780\times10^{-6}/30\times10^{-3}/\tan\{(180°/5)-42.7°/2\}\geq17.22\text{ (mm)}$$

Therefore, the diameter A of the inscribed circle with respect to the deflective reflection surfaces of the rotary polygon mirror 5 is determined to be 18.0 mm.

Accordingly, the necessary factors are prepared, that is, the pixel density Dpi is set to 1200 dpi, the print speed Ppm is set to 50 ppm, the surface number N of the rotary polygon mirror 5 is set to 5, the inscribed circle diameter A is set to 18 mm, and the thickness t of the rotary polygon mirror 5 is 3 mm. Based on these factors, the revolution number Rp, the maximum revolution number Rmax, and the optimized beam number M are calculated as:

$R_p$=122835 rpm;

$R_{max}$=34871 rpm; and $10.5 \geq M \geq 3.5$.

Therefore, the optimized number M of the laser light beams is determined to be a value of above four and below ten.

Next, an optical scanning system 200 according to another preferred embodiment of the present invention is explained with reference to FIG. 4. In FIG. 4, an upper part is a view of the optical scanning system 200 seen in a direction corresponding to a main scanning direction and a lower part is a view of the optical scanning system 200 seen in direction corresponding to a sub-scanning direction. The upper and lower parts are combined to correspond to each other in FIG. 4. The optical scanning system 200 of FIG. 4 is an exemplary overfilled type optical scanning system.

As shown in FIG. 4, the optical scanning system 200 includes a light source 201, a coupling lens 202, an aperture 203, a cylinder lens 204, a rotary polygon mirror 205, an imaging surface 208, and scanning lenses 261 and 262. The coupling lens 202 is referred to as a first optical lens system. The cylinder lens 204 is referred to as a second optical lens system. A set of the scanning lenses 261 and 262 is referred to as a third optical lens system 260.

In the optical scanning system 200 of FIG. 4, a light ray (i.e., a laser light beam) emitted from the light source 201 is coupled by the coupling lens 202 to become a desired light ray in a desired state. In this example, the laser light beam is coupled into an approximate parallel laser light beam. The light source 201 may be a semiconductor laser (LD), e.g., a laser diode, a semiconductor laser array (LDA) having a plurality of light emitting points, a multiple-beam light source generating multiple laser light beams using a plurality of LDs and prisms, for example, and so forth.

The coupling lens 202 may be a single aspheric surface lens and a wavefront aberration of the single coupling lens 202 is desirably corrected. The laser light beam traveling through the coupling lens 202 passes through a slit of the aperture 203 and then enters the second optical lens system (i.e., the cylinder lens 204). After traveling through the cylinder lens 204, the laser light beam impinges on a deflective reflection surface of the rotary polygon mirror 205 in a light state linearly extended in the main scanning direction.

A cross-sectional size ζ of the laser light beam output from the second optical lens system (i.e., the cylinder lens 204) is greater than a width η of the deflective reflection surface of the rotary polygon mirror 205, as shown in FIG. 5. This is the reason that the optical scanning system 200 is referred to as an overfilled optical system. In this system, the laser light beam output from the second optical lens system travels towards the rotary polygon mirror 205 to enter a rotary center 205a thereof with an angle of 5° relative to the horizontal line in the sub-scanning direction.

The rotary polygon mirror 205 deflects the entered laser light beam by reflection with an angle of 5° relative to the horizontal line in the sub-scanning direction, as shown in FIG. 4. When the rotary polygon mirror 205 is rotated, the deflective reflection surface of the rotary polygon mirror 205 sequentially changes its angle relative to the laser light beam and the deflection angle of the laser light beam is sequentially changed. Thus, the laser light beam is deflected and is consequently brought to scan an area in a predetermined angular range. After being deflected, the laser light beam travels in a straight line to pass through the third optical lens system 260 (i.e., the scanning lenses 261 and 262) and impinges on the imaging surface 208.

The third optical lens system 260 corrects for the laser light beam to correct bends of an image surface in the main scanning and sub-scanning directions and an fθ (ef-theta) characteristic with respect to an image to be formed on the imaging surface 208 by the scanning laser beam. Each output surface of the scanning lenses 261 and 262 has a special tilt surface. This special tilt surface corrects for a wave surface aberration and a scanning line bend caused by the tilt entrance of the laser light beam relative to the deflective reflection surface of the rotary polygon mirror 205. The imaging surface 208 may be a surface of an image carrying member made of a photosensitive material and having a drum shape or a belt shape.

The optical scanning system 200 further includes an optical synchronizing system (not shown) for detecting the laser light beam impinging on an external point and before the image scanning area relative to the imaging surface 208 and converting the detected laser light beam to a synchronizing signal.

The above-described components included in the optical scanning system 200 shown in FIG. 4 are provided with the following specific profiles. The light source 201 uses a four-channel LD (laser diode) array generating a plurality of laser light beams each having a wave length of 780 nm and a tilt angle of 0° at an image density of 1200 dpi, for example. The coupling lens 202 has a focal distance of 27 mm and performs collimation as a coupling operation, for example.

The aperture 203 decreases the diameter of the laser beam spot on the light axis at an image density of 1200 dpi to approximately 45 μm in the main scanning direction and 60 μm in the sub-scanning direction, for example. The aperture 203 is spaced by 4.5 mm from the coupling lens 202 and has a rectangular-shaped opening of 10 mm in the main scanning direction and 0.76 mm in the sub-scanning direction, for example. The cylinder lens 204 is made of borosilicate crown glass (e.g., BK7) and has a refractive index of 1.511188 for light having a 780-nm wave length, for example.

The rotary polygon mirror 205 includes twelve deflective reflection surfaces and has an inscribed circle having a radius of 12 mm, and each deflective reflection surface has a short side of 5 mm and a longitudinal side of 5.8 mm, for example. This longitudinal side is referred to as an effective width of the deflective reflection surface of the rotary polygon mirror 205 in the main scanning direction and serves as an actual aperture in the main scanning direction.

The scanning lenses 261 and 262 are made of polyolefin resin and have a refractive index of 1.523978 for light having a 780-nm wave length. The optical synchronizing system (not shown) includes a cylinder lens having a curvature in the sub-scanning direction and a photodiode (not shown) for detecting the laser light beam passing through the cylinder lens. The photodiode is mounted at a position substantially equivalent to the imaging position.

An angle formed by the laser light beam from the light source 201 with the light axis of the optical scanning system in the main scanning direction is 0°. An angle formed by the laser light beam from the light source 201 with the light axis of the optical scanning system in the sub-scanning direction is 10° and is equally split into two (i.e., 5°) relative to a normal line (indicated by a letter V in FIG. 4) to the deflective reflection surface of the rotary polygon mirror 205, for example. An effective recording width is ±150 mm, for example. An angle of field is ±38.3, for example.

As shown in FIG. 4, distances between adjacent input and output surfaces of the optical devices are defined as dn, where n varies from 0 to 7. For example, a distance between an output surface of the coupling lens 202 and the input surface of the cylinder lens 204 is d0, a thickness of the cylinder lens 204 is d1, a distance between the output surface of the cylinder lens 204 and the deflective reflection surface of the rotary polygon mirror 205 is d2, and so on.

The distance d0 is set to 50 mm, d1 to 3 mm, d2 to 114 mm, d3 to 72.56 mm, d4 to 35 mm, d5 to 61.93 mm, d6 to 14.00 mm, and d7 to 160.56 mm, for example.

The shape of the input surface of the scanning lens 261 is defined, for example, by the following factors and coefficients:

$Rm=2398.53056$;

$Rs(0)=-50.03500$;

$Km=1.86419\times 102$;

$a4=8.82727\times 10-9$;

$a6=-3.59413\times 10-13$;

$a8=-7.59250\times 10-17$;

$a10=1.07706\times 10-20$;

$B_2=2.25460\times 10^{-6}$;

$B_4=-1.51730\times 10^{-10}$;

$B_6=7.37777\times 10^{-15}$;

$B_8=-1.32711\times 10^{-19}$;

$B_{10}=-2.28168\times 10^{-22}$; and $B_{12}=-3.32790\times 10^{-26}$.

The shape of the output surface of the scanning lens 261 is defined, for example, by the following factors and coefficients:

$R_m=-141.13460$;

$R_s(0)=-200.19441$;

$K_m=-1.09903\times 10^{-1}$;

$a_4=1.87065\times 10^{-8}$;

$a_6=-5.40692\times 10^{-13}$;

$a_8=-5.76262\times 10^{-17}$;

$a_{10}=1.07382\times 10^{-20}$;

$a_{12}=1.88200\times 10^{-25}$;

$B_2=-2.06729\times 10^{-6}$;

$B_4=2.15373\times 10^{-11}$;

$B_6=2.84261\times 10^{-14}$;

$B_8=5.35038\times 10^{-19}$;

$B_{10}=-2.88629\times 10^{-22}$;

$B_{12}=-4.85261\times 10^{-26}$;

$F_2=7.67802\times 10^{-6}$;

$F_4=5.53153\times 10^{-10}$; and $F_6=-2.31024\times 10^{-14}$.

The shape of the input surface of the scanning lens 262 is defined, for example, by the following factors and coefficients:

$R_m=441.37902$;

$R_s(0)=-85.36788$;

$K_m=-1.22129\times 10$;

$a_4=-6.24258\times 10^{-9}$;

$a_6=-2.01059\times 10^{-13}$;

$a_8=7.49998\times 10^{-18}$;

$a_{10}=5.03996\times 10^{-22}$;

$a_{12}=-1.34691\times 10^{-26}$;

$a_{14}=-1.86272\times^{-31}$;

$B_2=-1.9033\times 10^{-7}$;

$B_4=2.25214\times 10^{-11}$;

$B_6=-3.86971\times 10^{-16}$;

$B_8=5.79885\times 10^{-20}$;

$B_{10}=3.52726\times 10^{-24}$; and $B_{12}=-1.76425\times 10^{-28}$.

The shape of the output surface of the scanning lens 262 is defined, for example, by the following factors and coefficients:

$R_m=986.16880$;

$R_s(0)=-28.90915$;

$K_m=-8.5521\times 10$;

$a_4=-1.38857\times 10^{-8}$;

$a_6=1.17925\times 10^{-13}$;

$a_8=1.95943\times 10^{-17}$;

$a_{10}=-3.37097'10^{-22}$;

$a_{12}=4.21148\times 10^{-27}$;

$a_{14}=-1.95989\times 10^{-31}$;

$B_2=4.91214\times 10^{-7}$, $B_4=-1.27013\times 10^{-11}$, $B_6=1.71709\times 10^{-15}$, $B_8=-2.95120\times 10^{-21}$, $B_{10}=-9.45943\times 10^{-25}$, $B_{12}=1.23476\times 10^{-28}$, $F_2=-1.59175\times 10^{-6}$;

$F_4 = -5.15487 \times 10^{-11}$; and $F_6 = -1.03420 \times 10^{-15}$.

Figure 6A:
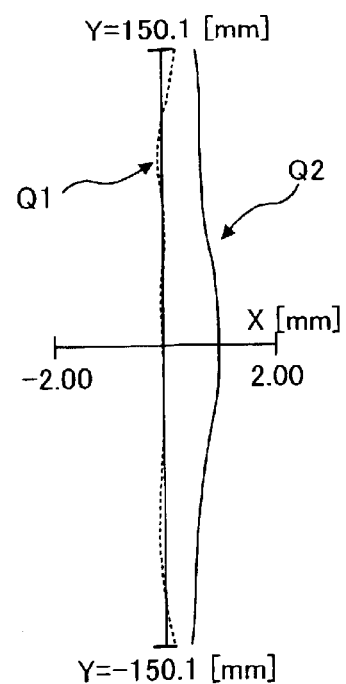
FIGS. 6A–6C are graphs showing various optical properties of the optical scanning system of FIG. 4.
Figure 6B:
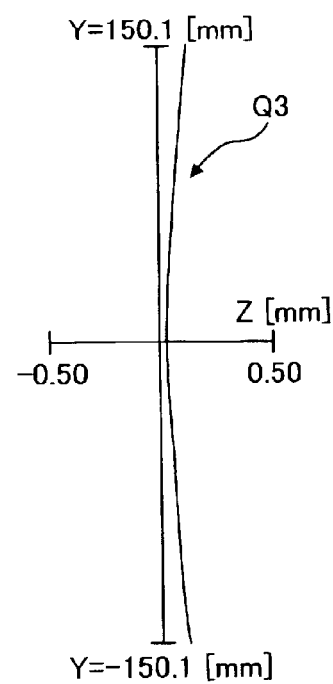
Figure 6C:
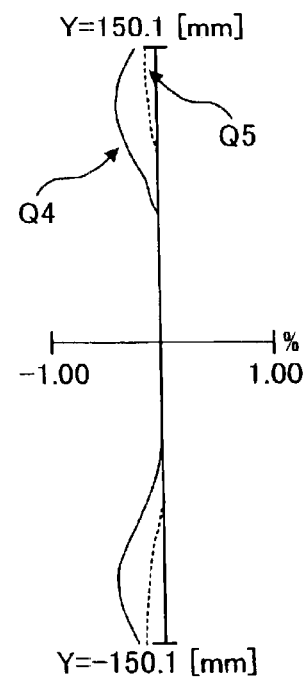

FIG. 6A shows properties of bends in an image surface in the main scanning and sub-scanning directions of the optical scanning system 200 by letters Q1 and Q2, respectively. As shown in FIG. 6A, the bends in an image surface in both main scanning and sub-scanning directions are within a range of from −0.20 mm to 0.20 mm in a main scanning region of from −150.1 mm to 150.1 mm and are considered to be preferable. In FIG. 6B, a property of bends in the scanning line is indicated by a letter Q3, which is within a range of from −0.50 mm to 0.50 mm in the main scanning region of from −150.1 mm to 150.1 mm, and is considered to be preferable. Also, FIG. 6C shows properties of linearity and fθ (ef-theta) of the optical scanning system 200 by letters Q4 and Q5, respectively. As shown in FIG. 6C, the linearity and the fθ (ef-theta) are within a range of from −1.00% to 1.00% and are considered to be preferable.

Figure 7A:
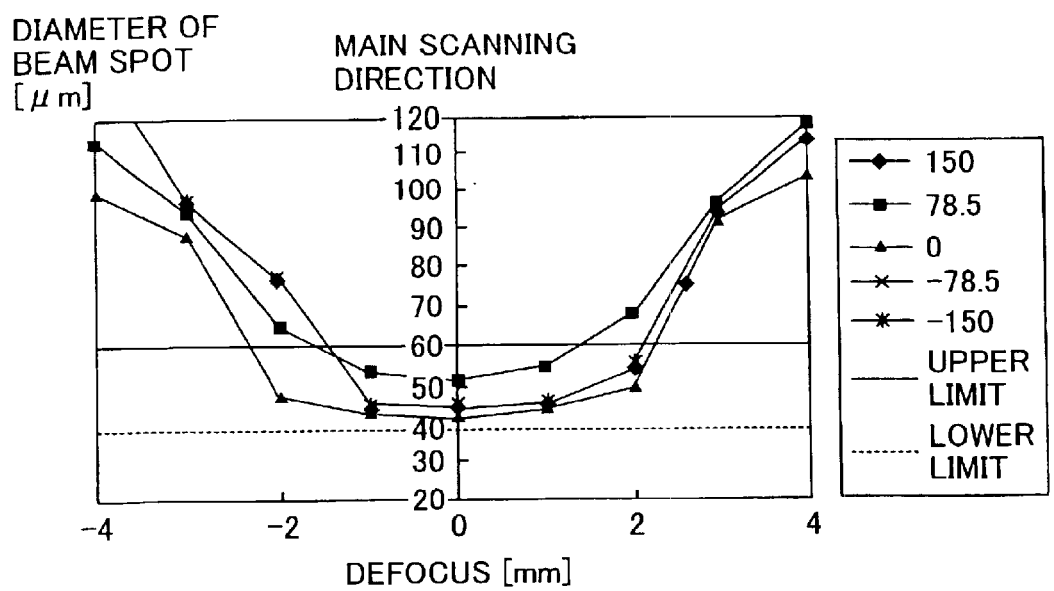
FIGS. 7A and 7B are graphs showing defocuses of the optical scanning system of FIG. 1A in the main scanning and sub-scanning directions.
Figure 7B:
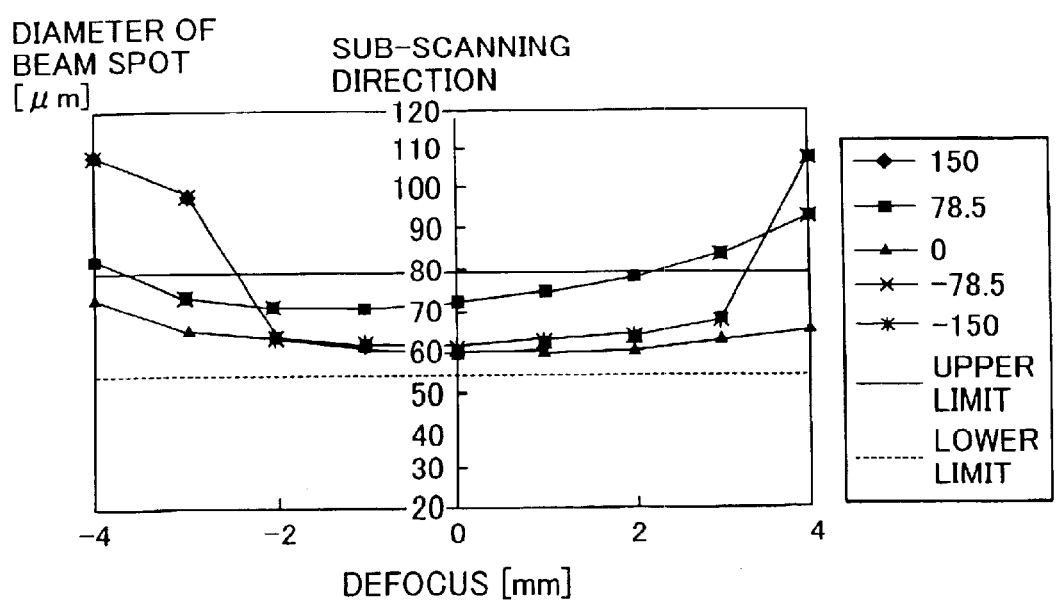

The above-structured optical scanning system 200 has properties of defocus in the main scanning direction, as shown in FIG. 7A, and in the sub-scanning direction, as shown in FIG. 7B.

Next, a description is made for an optimization of the number M with respect to multiple laser light beams to be used in place of a single laser light beam in the optical scanning system 200 that applies the overfilled optical system. Differing from the case adopting the underfilled optical system, the system having the overfilled optical system is advantageously capable of having a relatively small value for the inscribed circle diameter A of the rotary polygon mirror 205 and a relatively large value for the number M of the deflective reflection surfaces of the rotary polygon mirror 205, thereby being advantageous for a high speed scanning application. However, there is certainly a limit in increasing the revolution number of the rotary polygon mirror 205. In other words, it is needed to consider a problem of a bearing life with respect to the motor for the rotary polygon mirror 205 in addition to other problems of the wind noise, the vibration, the jitter, and the electric consumption.

Accordingly, the air resistance coefficient α is set to a value of $3.8 \times 10^6$ or smaller at the maximum revolution number $R_{max}$ of the rotary polygon mirror 205 to effectively assure the life of the bearing used for the rotary polygon mirror 205 while eliminating other problems of the wind noise, the vibration, the jitter, and the electric consumption. Accordingly, the maximum revolution number $R_{max}$ is expressed as:

$R_{max} = (3.8 \times 10^6) \times \sqrt{\{N^{1.6}/(A^4 \times t)\}}$. (rpm)

In the optical scanning system 200, the number M of the multiple laser light beams is optimized on the basis of a ratio between $R_{max}$ and $R_p$ defined above. More specifically, the optical scanning system 200 can properly perform its optical scanning operation without causing the above-mentioned bearing life problems when the number M satisfies the following relationship:

$3 \times R_p/R_{max} \geq M \geq R_p/R_{max}$

When the number M is reduced below the lower limit of the above relationship, the revolution number of the rotary polygon mirror is excessively increased and consequently the bearing life particularly becomes problematic. On the other hand, when the number M is increased above the upper limit of the above relationship, the laser light beam number is excessively increased and, as a result, the manufacturing costs and the beam control become serious problems.

The diameter A of the inscribed circle with respect to the deflective reflection surfaces of the rotary polygon mirror 205 directly contributes to a reduction of the air resistance. In the optical scanning system 200, the inscribed circle diameter A satisfies the following condition:

$A \geq (0.76 \times f_m \times \lambda/\omega_m)/\tan(180°/N)$, wherein λ is the wave length of the light source 201, $f_m$ is the focal distance of the third optical scanning lens system 260 in the main scanning direction, and $\omega_m$ represents a $1/e^2$ diameter of the laser light beam spot in the main scanning direction on the imaging surface 208. The diameter of the laser light beam spot in the main scanning direction on the imaging surface 208 is set to a diameter of the beam spot having an intensity of a $1/e^2$ relative to a line spread function (LSF) at a point of an image height of 0. By satisfying the above condition, the diameter A is not unnecessarily set to a large value even when the laser light beam spot is made small. Therefore, it facilitates to increase the speed of the rotary polygon mirror 205.

In the optical scanning system 200, the focal distance $f_m$ is set to 225 mm, the wave length λ is set to 780 nm, the beam spot diameter $\omega_m$ is set to 45 μm, and the deflective reflection surface number N is set to 12. Accordingly, the inscribed circle diameter A is calculated as below:

$A \geq 0.76 \times 225 \times 780 \times 10^{-6}/45 \times 10^{-3}/\tan(180°/12) \geq 11.06$. (mm)

Therefore, the diameter A of the inscribed circle with respect to the deflective reflection surfaces of the rotary polygon mirror 205 is determined to be 12.0 mm.

Accordingly, the necessary factors are prepared, that is, the pixel density Dpi is set to 1200 dpi, the print speed Ppm is set to 80 ppm, the surface number N of the rotary polygon mirror 205 is set to 12, the inscribed circle diameter A is set to 12 mm, and the thickness t of the rotary polygon mirror 205 is 5 mm. Based on these factors, the revolution number Rp, the maximum revolution number Rmax, and the optimized beam number M are calculated as:

Rp = 81889 rpm;

Rmax = 86155 rpm; and $2.9.5 \geq M \geq 0.95$.

Therefore, the optimized number M of the laser light beams is determined to be a value of two.

As discussed earlier in the background section, the beam spot in a range of from 60 μm to 70 μm is too large for the pixel pitch at a high pixel density of 1200 dpi or higher, and results in a degradation in the gray-scale reproducibility with respect to a halftone image such as a photo image. Also, such a beam spot consequently reduces the energy density of the beam power on the imaging surface and results in a degradation in the reproducibility with respect to a one dot image. To avoid these problems, it is preferable to set the laser light beam spot in both main scanning and sub-scanning directions to a value of 50 μm or less. Here, the diameter of the laser light beam spot is a diameter of the beam spot having an intensity of a $1/e^2$ relative to a line spread function (LSF) at a point of an image height of 0.

The above-mentioned value of 50 μm or less for the beam spot can be achieved by the third optical scanning lens system 60 or 260. That is, the third optical scanning lens system 60 or 260 includes at least two optical devices, as described above, and includes at least one special surface having a non-circular-arc shape in both main scanning and sub-scanning directions. The non-circular-arc shape of this special surface with respect to the optical device included in the third optical scanning lens system 60 or 260 is expressed by the above-described expression of X(Y,Z). The power series of Yn in the main scanning direction is preferably extended to the tenth order or higher, and the power series of Zj in the sub-scanning direction is preferably extended to the sixth order or higher.

Next, a rotary polygon mirror apparatus 300 according to a preferred embodiment of the present invention is explained with reference to FIG. 8. The rotary polygon mirror apparatus 300 of FIG. 8 includes a rotary polygon mirror 305, a rotary shaft 320, a rotor case 321, a ring-shaped magnet 322, a stator core 323, a motor frame 324, a case 325, and a sleeve 327. The rotary polygon mirror 305 may be the rotary polygon mirror 5 shown in FIG. 1A or the rotary polygon mirror 205 shown in FIG. 4.

Figure 8:
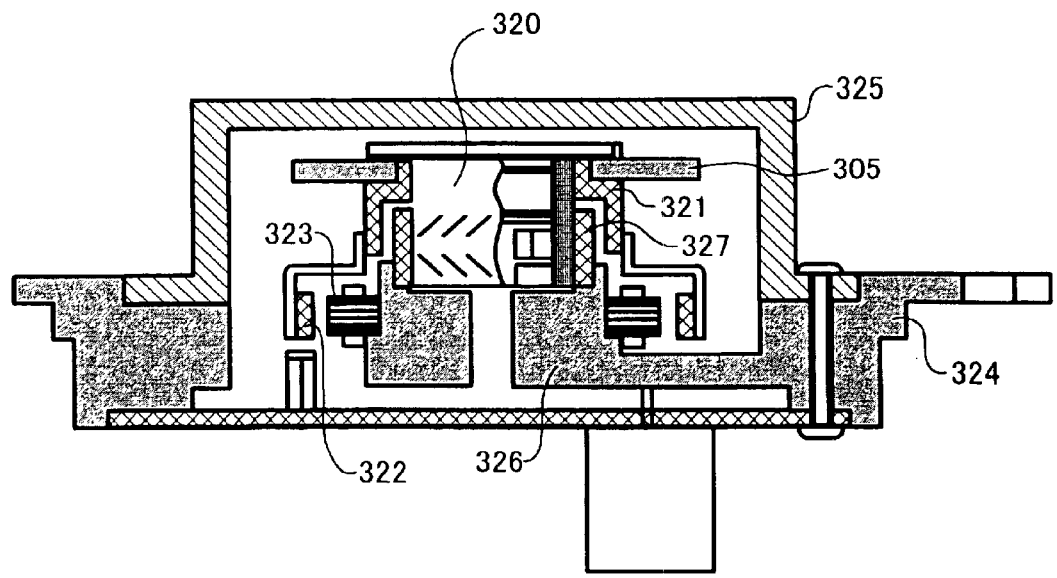
FIG. 8 is a schematic view of a rotary polygon mirror unit according to another preferred embodiment of the present invention.

As shown in FIG. 8, the motor frame 324 includes at the central portion a core holder portion 326 formed in a cylindrical shape, and the stator core 323 is fitted to the outer surface of the core holder portion 326. The stator core 323 has a plurality of protruding electrodes, each wound with a driving coil, thereby making up a stator of the motor. The sleeve 327 is fitted to an upper end of the core holder portion 326. The rotary shaft 320 is inserted into the sleeve 327. The rotary shaft 320 has an outer surface in which grooves in a herringbone for a dynamic pressure are provided so that small air gaps are formed between the outer surface of the rotary shaft 320 and the inner surface of the sleeve 327. In this way, an air dynamic pressure bearing is structured between the rotary shaft 320 and the sleeve 327.

The rotor case 321 is fitted to the outside upper end of the rotary shaft 320, and the rotary polygon mirror 305 is firmly fitted to an outside upper portion of the rotor case 321 with a cramp (not shown). The rotor case 321 has a lower skirt portion that covers the stator of the motor, and the ring-shaped magnet 322 is fitted to an inside surface of the lower skirt portion of the rotor case 321. The ring-shaped magnet 322, the rotor case 321, and the rotary shaft 320 form a rotor of the motor with which the rotary polygon mirror 305 is rotated. The ring-shaped magnet 322 has magnetic poles having a predetermined space in the circumferential direction, and the inner surface of the ring-shaped magnet 322 faces the tips of the plurality of protruding electrodes of the stator core 323 spaced by a predetermined distance.

The driving coils of the stator are sequentially energized in accordance with the rotational position of the ring-shaped magnet 322 so that the above-mentioned rotor is driven for rotation. By rotating the rotor at a high speed, an air dynamic pressure is generated at the air dynamic pressure bearing portion formed between the outer surface of the rotary shaft 320 and the inner surface of the sleeve 327. Thereby, the rotary shaft 320 is held for rotation in a radial direction without contacting the sleeve 327. This system achieves an elimination of wearing by the bearing, a long-life of the rotary polygon mirror, a prevention of heat generation, and a reduction of electric consumption.

When the rotary polygon mirror 305 is rotated at a high speed, it inevitably generates a noise. The case 325 fixed to the frame 324 prevents or at least reduces the leakage of the noise to the outside. Although it is not shown, the case 325 is provided with a sound insulation glass at a position where the laser light beam passes through to enter to and exit from the rotary polygon mirror 305. Thus, the rotary polygon mirror 305 and its driving motor are sealed and entry of dust from outside is prevented.

Figure 9:
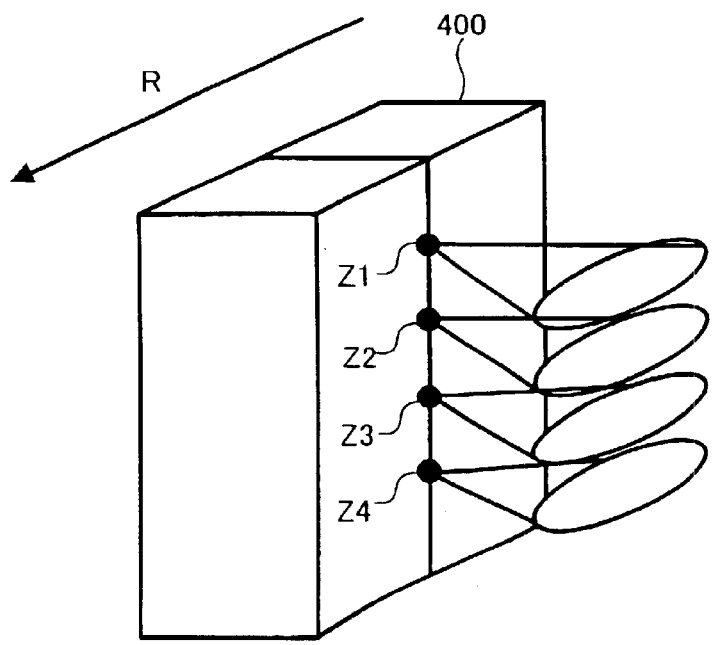
FIG. 9 is a schematic view of a light source according to another preferred embodiment of the present invention.

FIG. 9 shows an exemplary light source 400 for use in the optical scanning system 100 or 200. As shown in FIG. 9, the light source 400 includes a monolithic semiconductor laser array having light elements Z1–Z4 arranged in line in a direction perpendicular to the main scanning direction indicated by a letter R. Accordingly, the light source 400 emits four laser light beams from the light elements $Z1 \geqq Z4$ in line perpendicular to the main scanning direction.

Figure 10:
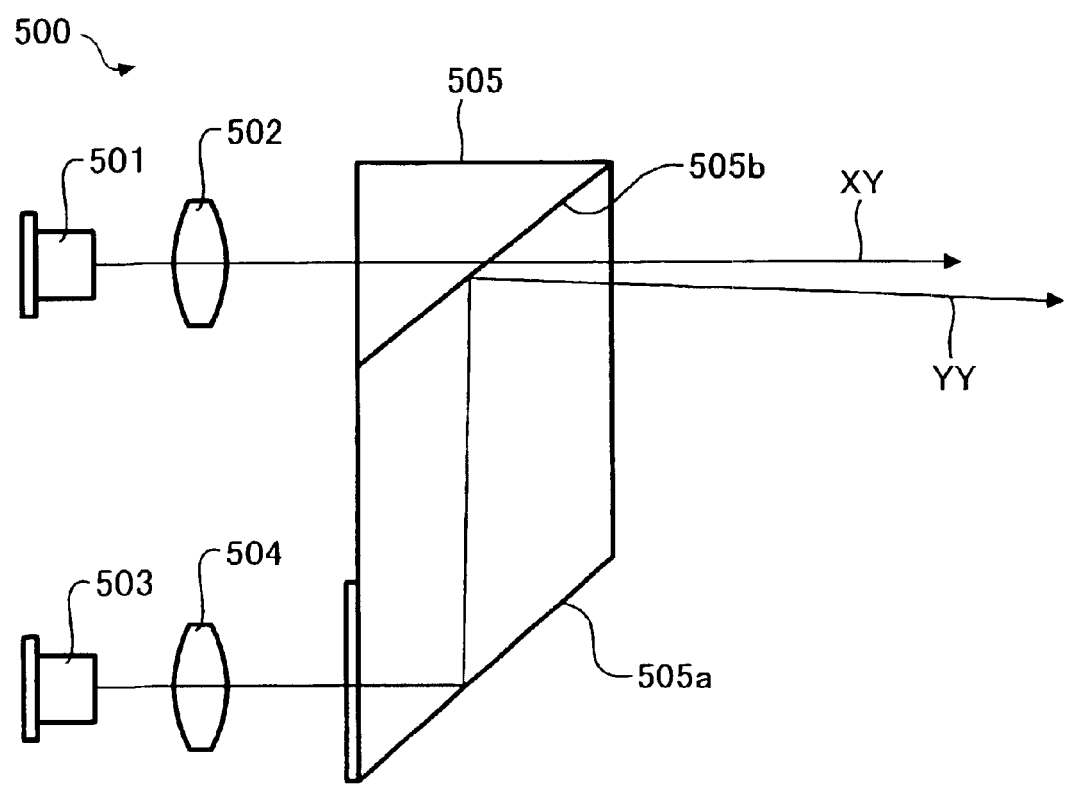
FIG. 10 is a schematic view of a light source unit according to another preferred embodiment of the present invention.

FIG. 10 shows an exemplary light source unit 500 for use in the optical scanning system 100 or 200. As shown in FIG. 10, the light source unit 500 includes two separate light sources 501 and 503, coupling lenses 502 and 504, and a prism 505. The light source 501 emits a laser light beam that travels through the coupling lens 502 to the prism 505. Likewise, a laser light beam emitted from the light source 503 passes through the coupling lens 504 and enters the prism 505. The prism 505 includes a total reflection surface 505a having an angle of approximately 45° relative to an input surface that receives the laser light beam from the light source 501. The prism 505 further includes an inner half-mirror surface 505b for passing a part of the laser light beam from the light source 501 and reflecting a part of the laser light beam emitted by the light source 502 and then reflected by the total reflection surface 501a. In FIG. 10, a laser light beam indicated by letters XY is a mixture of a part of the laser light beam from the light source 501 and a part of the laser light beam reflected by the total reflection surface 505a. Thus, the laser light beams from the light sources 501 and 502 are combined. Also, a laser light beam indicated by letters YY is a part of the laser light beam generated by the light source 502 and reflected by the total reflection surface 505a.

The above-described optical scanning systems 100 and 200 can be used in an image forming apparatus. To do this, the imaging surface 8 or 208 is applied as a surface of a photosensitive drum or belt that serves as an image carrying member, and a series of electrophotographic processes, including charging, exposure, development, image transfer, cleaning, discharging, and so on, are conducted relative to the surface of the photosensitive drum or belt. After the image transfer process, an image on a recording sheet is subjected to a heat fixing process, thereby reproducing an image on a recording sheet. The optical scanning system 100 or 200 is used for the exposure process in the above-mentioned electrophotographic processes. In the exposure process, a driving signal for driving the light source of the optical scanning system 100 or 200 is modulated with an image signal to generate a laser light beam modulated with the image signal. Then, the modulated laser light beam scans the imaging surface 8 or 208 so that an electrostatic latent image is formed on the imaging surface 8 or 208 in accordance with the image signal. This latent image is then developed with toner. After that, the toner developed image is transferred onto a recording sheet and is then fixed. Thus, a fixed image is reproduced on a recording sheet.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. JPAP2001-326329 filed on Oct. 24, 2001, in the Japanese Patent Office, the entire contents of which are hereby incorporated by reference herein.

What is claimed is:

1. An optical scanning apparatus comprising:
   a predetermined number M of light sources emitting a laser light beam;

a first optical scanning lens system configured to perform a coupling process relative to the laser light beam emitted from the predetermined number M of light sources;

a second optical scanning lens system configured to gather light of the laser light beam from the first optical scanning lens system in an approximately linear state extended in a main scanning direction;

a rotary polygon mirror having a predetermined number N of deflective reflection surfaces and configured to receive and deflect the laser light beam gathered in the approximately linear state; and a third optical scanning lens system configured to gather the deflected laser light beam from the rotary polygon mirror to form a beam spot on an imaging surface, wherein the predetermined number M satisfies a condition:

$$3 \times R_p/R_{max} \geq M \geq R_p/R_{max},$$

wherein $R_p$ and $R_{max}$ are defined as:

$$R_p = (D_{pi}/25.4) \times (260 \times P_{pm})/N,$$

$$R_{max} = (5.4 \times 10^6) \times \sqrt{\{N^{1.6}/(A^4 \times t)\}}, \text{ respectively,}$$

wherein M is greater than two, $R_p$ is a revolution number (rpm) of the rotary polygon mirror in a single beam mode, $R_{max}$ is a maximum revolution number (rpm) of the rotary polygon mirror, $D_{pi}$ is a pixel density (dpi) in a sub-scanning direction, $P_{pm}$ is a print speed (ppm) expressed in a number of A4-sized print pages in a landscape orientation, N is a number of the deflective reflection surfaces of the rotary polygon mirror, A is a radius (mm) of an inscribed circle with respect to the deflective reflection surfaces of the rotary polygon mirror, and t is a thickness (mm) of each deflective reflection surface of the rotary polygon mirror.

2. An optical scanning apparatus as defined in claim 1, wherein the optical scanning apparatus uses an underfilled optical system.

3. An optical scanning apparatus as defined in claim 2, wherein a diameter $\omega_m$ of the beam spot in the main scanning direction, formed on the imaging surface by the third optical scanning lens system, is a 1/e² diameter and is equal to or smaller than 50 μm, and the radius A of the inscribed circle with respect to the deflective reflection surfaces of the rotary polygon mirror satisfies a condition:

$$A \geq (0.76 \times f_m \times \lambda/\omega_m)/\tan\{(180°/N) - (\theta/2)\},$$

wherein λ (mm) is a central wave length of the light source, fm (mm) is a focal distance of the third optical scanning lens system in the main scanning direction, and θ is a half field angle of the third optical scanning lens system, including a synchronizing laser light beam.

4. An optical scanning apparatus as defined in claim 1, wherein the optical scanning apparatus uses an overfilled optical system.

5. An optical scanning apparatus as defined in claim 4, wherein a diameter $\omega_m$ of the beam spot in the main scanning direction, formed on the imaging surface by the third optical scanning lens system, is a 1/e² diameter and is equal to or smaller than 50 μm, and the radius A of the inscribed circle with respect to the deflective reflection surfaces of the rotary polygon mirror satisfies a condition;

$$A \geq (0.76 \times f_m \times \lambda/\omega_m)/\tan(180°/N),$$

wherein λ (mm) is a central wave length of the light source, $f_m$ (mm) is a focal distance of the third optical scanning lens system in the main scanning direction, and θ is a half field angle of the third optical scanning lens system, including a synchronizing laser light beam.

6. An optical scanning apparatus as defined in claim 4, wherein the predetermined number M of light sources are made of a monolithic semiconductor laser array.

7. An optical scanning apparatus as defined in claim 4, wherein the predetermined number M of light sources are packaged in a single light source unit and light rays emitted by the light sources are synthesized to a single light beam.

8. An optical scanning apparatus as defined in claim 4, wherein the rotary polygon mirror is driven by an air bearing motor.

9. An optical scanning apparatus as defined in claim 4, wherein each of the diameter $\omega_m$ in the main scanning direction and a diameter in a sub-scanning direction with respect to the beam spot formed on the imaging surface by the third optical scanning lens system is a 1/e² diameter and is equal to or smaller than 50 μm.

10. An optical scanning apparatus as defined in claim 9, wherein the third optical scanning lens system includes at least two optical devices that include at least one surface having a non-circular-arc shape in the main scanning and sub-scanning directions.

11. An image forming apparatus which prints at a speed of 50 ppm or higher expressed in a number of A4-sized print pages in a landscape orientation and at a pixel density of 1200 dpi, comprising:

an optical scanning apparatus as defined in claim 2.

12. An image forming apparatus which prints at a speed of 50 ppm or higher expressed in a number of A4-sized print pages in a landscape orientation and at a pixel density of 1200 dpi, comprising:

an optical scanning apparatus as defined in claim 4.

13. An optical scanning apparatus comprising:

a predetermined number M of light source means for emitting a laser light beam;

first optical means for performing a coupling process relative to the laser light beam emitted from the predetermined number M of light source means;

second optical means for gathering light of the laser light beam from the first optical means in an approximately linear state extended in a main scanning direction;

deflecting means for rotating a predetermined number N of deflective reflection surfaces to deflect the laser light beam gathered in the approximately linear state; and third optical means for gathering the deflected laser light beam deflected by the deflecting means to form a beam spot on an imaging surface, wherein the predetermined number M satisfies a condition:

$$3 \times R_p/R_{max} \geq M \geq R_p/R_{max},$$

wherein $R_p$ and $R_{max}$ are defined as:

$$R_p = (D_{pi}/25.4) \times (260 \times P_{pm})/N,$$

$$R_{max} = (5.4 \times 10^6) \times \sqrt{\{N^{1.6}/(A^4 \times t)\}}, \text{ respectively,}$$

wherein M is greater than two, Rp is a revolution number (rpm) of the deflecting means in a single beam mode, Rmax is a maximum revolution number (rpm) of the deflecting means, Dpi is a pixel density (dpi) in a sub-scanning direction, Ppm is a print speed (ppm) expressed in a number of A4-sized print pages in a landscape orientation, N is a number of the deflective reflection surfaces rotated by the deflecting means, A is a radius (mm) of an inscribed circle with respect to the deflective reflection surfaces rotated by the deflecting means, and t is a thickness (mm) of each deflective reflection surface rotated by the deflecting means.

14. An optical scanning apparatus as defined in claim 13, wherein the optical scanning apparatus uses an underfilled optical system.

15. An optical scanning apparatus as defined in claim 14, wherein a diameter $\omega_m$ of the beam spot in the main scanning direction, formed on the imaging surface by the third optical means, is a $1/e^2$ diameter and is equal to or smaller than 50 μm, and the radius A of the inscribed circle with respect to the deflective reflection surfaces rotated by the deflecting means satisfies a condition:

$$A \geq (0.76 \times f_m \times \lambda/\omega_m)/\tan\{(180°/N)-(\theta/2)\},$$

wherein λ (mm) is a central wave length of the light source, $f_m$ (mm) is a focal distance of the third optical means in the main scanning direction, and θ is a half field angle of the third optical means, including a synchronizing laser light beam.

16. An optical scanning apparatus as defined in claim 13, wherein the optical scanning apparatus uses an overfilled optical system.

17. An optical scanning apparatus as defined in claim 16, wherein a diameter $\omega_m$ of the beam spot in the main scanning direction, formed on the imaging surface by the third optical means, is a $1/e^2$ diameter and is equal to or smaller than 50 μm, and the radius A of the inscribed circle with respect to the deflective reflection surfaces rotated by the deflecting means satisfies a condition:

$$A \geq (0.76 \times f_m \times \lambda/\omega_m)/\tan(180°/N),$$

wherein λ (mm) is a central wave length of the light source, $f_m$ (mm) is a focal distance of the third optical means in the main scanning direction, and θ is a half field angle of the third optical means, including a synchronizing laser light beam.

18. An optical scanning apparatus as defined in claim 16, wherein the predetermined number M of light source means are made of a monolithic semiconductor laser array.

19. An optical scanning apparatus as defined in claim 16, wherein the predetermined number M of light source means are packaged in a single light source means and light rays emitted by the light sources are synthesized to a single light beam.

20. An optical scanning apparatus as defined in claim 16, wherein the deflective reflection surfaces are driven by an air bearing motor.

21. An optical scanning apparatus as defined in claim 16, wherein each of the diameter $\omega_m$ in the main scanning direction and a diameter in the sub-scanning direction with respect to the beam spot formed on the imaging surface by the third optical means is a $1/e^2$ diameter and is equal to or smaller than 50 μm.

22. An optical scanning apparatus as defined in claim 21, wherein the third optical means includes at least two optical devices which includes at least one surface having a non-circular-arc shape in the main scanning and sub-scanning directions.

23. An optical scanning method comprising:
emitting a laser light beam with a predetermined number M of light sources;
performing a coupling process with a first optical scanning lens system relative to the laser light beam emitted from the predetermined number M of light sources;
collecting light of the laser light beam from the first optical scanning lens system in an approximately linear state extended in a main scanning direction using a second optical scanning lens system;
rotating a predetermined number N of deflective reflection surfaces of a rotary polygon mirror to deflect the laser light beam gathered in the approximately linear state; and
gathering the deflected laser light beam deflected by the deflective reflection surfaces of the rotary polygon mirror to form a beam spot on an imaging surface using a third optical scanning lens system,
wherein the predetermined number M satisfies a condition:

$$3 \times R_p/R_{max} \geq M \geq R_p/R_{max},$$

wherein $R_p$ and $R_{max}$ are defined as:

$$R_p \equiv (D_{pi}/25.4) \times (260 \times P_{pm})/N,$$
$$R_{max} \equiv (5.4 \times 10^6) \times \sqrt{\{N^{16}/(A^4 \times t)\}}, \text{ respectively,}$$

wherein M is greater than two, $R_p$ is a revolution number (rpm) of the rotary polygon mirror in a single beam mode, $R_{max}$ is a maximum revolution number (rpm) of the rotary polygon mirror, $D_{pi}$ is a pixel density (dpi) in a sub-scanning direction, $P_{pm}$ is a print speed (ppm) expressed in a number of A4-sized print pages in a landscape orientation, N is a number of the deflective reflection surfaces of the rotary polygon mirror, A is a radius (mm) of an inscribed circle with respect to the deflective reflection surfaces of the rotary polygon mirror, and t is a thickness (mm) of each deflective reflection surface of the rotary polygon mirror.

24. An optical scanning method as defined in claim 23, wherein the optical scanning method uses an underfilled optical system.

25. An optical scanning method as defined in claim 24, wherein a diameter $\omega_m$ of the beam spot in the main scanning direction, formed on the imaging surface by the third optical scanning lens system, is a $1/e^2$ diameter and is equal to or smaller than 50 μm, and the radius A of the inscribed circle with respect to the deflective reflection surfaces of the rotary polygon mirror satisfies a condition:

$$A \geq (0.76 \times f_m \times \lambda/\omega_m)/\tan\{(180°/N)-(\theta/2)\},$$

wherein λ (mm) is a central wave length of the light source, $f_m$ (mm) is a focal distance of the third optical scanning lens system in the main scanning direction, and θ is a half field angle of the third optical scanning lens system, including a synchronizing laser light beam.

26. An optical scanning method as defined in claim 23, wherein the optical scanning method uses an overfilled optical system.

27. An optical scanning method as defined in claim 26, wherein a diameter $\omega_m$ of the beam spot in the main scanning direction, formed on the imaging surface by the third optical scanning lens system, is a $1/e^2$ diameter and is equal to or smaller than 50 µm, and the radius A of the inscribed circle with respect to the deflective reflection surfaces of the rotary polygon mirror satisfies a condition:

$$A \geq (0.76 \times f_m \times \lambda/\omega_m)/\tan(180°/N),$$

wherein λ (mm) is a central wave length of the light source, $f_m$ (mm) is a focal distance of the third optical scanning lens system in the main scanning direction, and θ is a half field angle of the third optical scanning lens system, including a synchronizing laser light beam.

28. An optical scanning method as defined in claim 26, wherein the predetermined number M of light sources are made of a monolithic semiconductor laser array.

29. An optical scanning method as defined in claim 26, wherein the predetermined number M of light sources are packaged in a single light source unit and light rays emitted by the light sources are synthesized to a single light beam.

30. An optical scanning method as defined in claim 26, wherein the deflective reflection surfaces are driven by an air bearing motor.

31. An optical scanning method as defined in claim 26, wherein each of the diameter $\omega_m$ in the main scanning direction and a diameter in the sub-scanning direction with respect to the beam spot formed on the imaging surface by the third optical scanning lens system is a $1/e^2$ diameter and is equal to or smaller than 50 µm.

32. An optical scanning method as defined in claim 31, wherein the third optical scanning lens system includes at least two optical devices that include at least one surface having a non-circular-arc shape in the main scanning and sub-scanning directions.

* * * * *